United States Patent
Smelser

(10) Patent No.: US 8,454,105 B2
(45) Date of Patent: Jun. 4, 2013

(54) AUTOMATED BEAM MARKER

(76) Inventor: James M. Smelser, Sandy, UT (US)

( * ) Notice: Subject to any disclaimer, the term of this patent is extended or adjusted under 35 U.S.C. 154(b) by 98 days.

(21) Appl. No.: 13/181,280

(22) Filed: Jul. 12, 2011

(65) Prior Publication Data
US 2012/0013661 A1     Jan. 19, 2012

Related U.S. Application Data

(60) Provisional application No. 61/364,510, filed on Jul. 15, 2010.

(51) Int. Cl.
*B41J 3/00* (2006.01)
(52) U.S. Cl.
USPC .................................. 347/2; 347/9; 347/225
(58) Field of Classification Search
USPC ................. 347/2, 9, 224, 225, 229, 232, 238, 347/242, 245
See application file for complete search history.

(56) References Cited

U.S. PATENT DOCUMENTS

| | | | |
|---|---|---|---|
| 5,144,330 A * | 9/1992 | Bennett | 347/2 |
| 5,351,942 A * | 10/1994 | Mori et al. | 269/25 |
| 6,791,592 B2 * | 9/2004 | Assa et al. | 347/225 |
| 6,824,337 B2 | 11/2004 | Pentz et al. | |
| 7,074,360 B2 | 7/2006 | Wolven | |
| 7,259,872 B2 | 8/2007 | Mullikin | |
| 7,367,087 B2 | 5/2008 | Colombo et al. | |
| 2007/0199930 A1 | 8/2007 | McElroy et al. | |
| 2010/0007871 A1 | 1/2010 | Blanco | |

OTHER PUBLICATIONS

Ficep Corporation, "Ficep Offers the Most Comprehensive Line of CNC Structural Drilling Systems Available in the Market Today," http://www.ficepcorp.com/drilling.cfm, Accessed Jan. 25, 2010, pp. 1-3.
Ficep Corporation, "Robotic Coping System," http://www.ficepcorp.com/beamcoping.cfm, Accessed Jan. 25, 2010, pp. 1-2.

* cited by examiner

*Primary Examiner* — Juanita D Jackson
(74) *Attorney, Agent, or Firm* — Craig Metcalf; Kirton McConkie

(57) ABSTRACT

A beam marking system is disclosed for marking on beams with a marking device. The beam marking system includes a beam marking device configured to mark on the surface of a beam. A movable arm is coupled to the marking device. The movable arm has at least three movable components that collectively move the beam marking device along or about at least three axes. A controller is in electronic communication with the movable arm and the marking device. The controller controlling the movement of the at least three movable components of the movable arm and controlling the operation of the marking device. In some instances, the beam marking system can automatically mark beams, such as metal beams used in heavy construction projects in a rapid and accurate manner.

20 Claims, 23 Drawing Sheets

AUTOMATED BEAM MARKER

RELATED APPLICATIONS

This application claims the benefit of U.S. Provisional Application No. 61/364,510 filed Jul. 15, 2010, entitled AUTOMATED BEAM MARKER, which is incorporated herein by reference.

BACKGROUND

The present invention relates generally to marking beams. In particular, the present invention relates to systems and methods for automatic beam marking that uses lasers to mark each exterior side of a structural beam.

In construction projects involving many structural beams it is common to mark beams with instructions, identification numbers, and other useful marks that facilitate the preparation and installation of the beams. This is particularly useful in large construction projects that use large number of beams that are each custom prepared prior to assembly. Once marked, a beam can be identified, modified, and installed efficiently and accurately.

Historically, most beam marking has been entirely done by hand, using tools such as a piece of soap stone, a measuring tape, and a print out containing marks descriptions and beam coordinates. Because a beam can include a large number of marks, each of which needs to be accurately measured and marked by hand, the marking process is labor intensive, slow, and includes the potential for human error. In the manufacturing and building process, beam marking can create backlogs and delays. In addition to being slow, beam marking involves the risk that the marks will be washed or scraped off before the beam is installed. Generally, marks are made with soap stone, which might be degraded if rubbed, scraped, wetted, or soiled. Accordingly, there is a need in the art solutions to the problems associated with manual or etched beam marking. Such a solution is disclosed herein.

SUMMARY

The present invention relates generally to marking beams. In particular, the present invention relates to systems and methods for beam marking that uses lasers or other such marking devices to mark each exterior side of a structural beam. To rapidly, accurately, and safely mark a beam, a beam marker machine is provided which includes a marking device disposed on a movable arm. The movable arm moves along multiple axis of movement, such as three or more, so that it is capable of aiming the laser marker at all of the external surfaces of a beam. In some instances, a laser marker is used, which enables very rapid marking by rapidly scanning a laser beam across a beam surface, which is much faster than traditional marking techniques. The laser permanently discolors rather than scores the beam. The nature of laser marking enables the laser marker to scan hard to reach surfaces, concave and convex surfaces, and to provide markings on all external surfaces of a beam. By including a laser marker or other automated marking device within a beam marking system, beams can be quickly marked efficiently and accurately, in a manner that overcomes the problems associated with prior beam marking systems and methods.

In one aspect of the invention, a beam marking system comprises: a beam marking device configured to mark on the surface of a beam; a movable arm coupled to the marking device, the movable arm having at least three movable components that collectively move the beam marking device along or about at least three axes; and a controller in electronic communication with the movable arm and the marking device, the controller controlling the movement of at least three movable components of the movable arm and controlling the operation of the marking device.

Implementations may include one or more of the following features. The marking device may be a laser marker, a plasma marker, an inkjet marker, or an etching device. The marking device may be a laser marker that may include a laser source and laser scanner. The laser marker may include a pulsed beam laser. The movable arm may have at least four movable components that collectively move the beam marking device along or about at least four axes, and wherein the controller controlling the movement of the at least four movable members. The at least four axes may include an X axis, a Y axis, a Z axis, and θ axis. The system may further comprise a computer program in operable association with the controller. The computer program receives data corresponding to a beam marking layout and translates the beam marking layout data to machine readable instructions that are readable by the controller. The beam marking system may further comprise: a chassis for supporting a beam; a movement system moving the beam along the chassis; and a measuring system measuring the movement of the beam along the chassis. The movement system may include a clamp and one or more drive rollers. The chassis may include cam rollers for supporting a beam. The measuring system may include at least one measuring wheel positioned such that it contacts a beam moving through the movement system. A second movable arm may include that is movable along at least three directions of movement. The second movable arm may have a second marking device. The controller may be in electronic communication with the second movable arm and the second marking device. The controller may control the position and movement of the second movable arm and may control the operation of the second marking device.

In another aspect, a beam marking system comprises: a chassis configured to support a beam; a laser marker configured to mark on the surface of the beam; a movable arm coupled to the chassis and the marking device, the movable arm having at least three movable components that collectively move the laser marker along or about at least three axes; and a controller in electronic communication with the movable arm and the marking device, the controller controlling the movement of the at least three movable components of the movable arm and controlling the operation of the laser marker.

Implementations may include one or more of the following features. The movable arm may have at least four movable components that collectively move the beam marking device along or about at least four axes. The controller may control the movement of the at least four movable members. The at least four axes may include an X axis, a Y axis, a Z axis, and θ axis. A computer program may be in operable association with the controller. The computer program may receive data corresponding to a beam marking layout and translates the beam marking layout data to machine readable instructions that are readable by the controller. A second movable arm may be movable along at least three directions of movement. The second movable arm may have a second marking device, the controller in electronic communication with the second movable arm and the second marking device. The controller may control the position and movement of the second movable arm and may control the operation of the second marking device. The beam marking system may further comprise: a movement system moving the beam along the chassis; and a measuring system measuring the movement of the beam along the chassis.

In another aspect, a beam marking system comprises: a chassis; a movement system coupled to the chassis, the movement system moving a beam along the chassis; a first beam marking device configured to mark on the surface of a beam; a first movable arm coupled to the chassis, the first movable arm being coupled to the first beam marking device, the movable arm having at least four movable components that collectively move the beam marking device along or about at least four axes; a second beam marking device configured to mark on the surface of a beam; a second movable arm coupled to the chassis, the second movable arm being coupled to the second beam marking device, the movable arm having at least three movable components that collectively move the beam marking device along or about at least three axes; a controller in electronic communication with the first and second movable arms and the first and second beam marking devices, the controller controlling the movement of the first and second movable arms and controlling the operation of the first and second beam marking devices.

Implementations may include one or more of the following features. The marking device may be a plasma marking device. The marking device may be a laser marking device. The marking device may be an etching device.

In another aspect, a method for marking a beam includes providing a beam and moving an arm to aim a laser marker disposed on the arm directly at a first surface of the beam. The method also includes marking the first external surface of the beam with the laser marker. And finally, the method includes repeating moving the arm and marking a surface of the beam for each external surface of the beam on at least a top portion of the beam.

In some implementations, the method may include repeating moving the arm and marking a surface of the beam for each external surface of the beam on at least a bottom portion of the beam. The arm may be coupled to a chassis, and the method may include advancing the beam through the chassis. The method may include measuring the length of the beam that is advanced through the chassis and determining, based on the length measurements, the coordinates of the beam in proximity to the arm. The method may include receiving an electronic layout of marks to be placed on the beam, translating the electronic layout to machine readable instructions, and implementing the machine readable instructions by the steps of moving and marking.

These and other features and advantages of the present invention may be incorporated into certain embodiments of the invention and will become more fully apparent from the following description and appended claims, or may be learned by the practice of the invention as set forth hereinafter. The present invention does not require that all the advantageous features and all the advantages described herein be incorporated into every embodiment of the invention.

BRIEF DESCRIPTION OF THE SEVERAL VIEWS OF THE DRAWINGS

In order that the manner in which the above-recited and other features and advantages of the invention will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE DRAWINGS

The presently preferred embodiments of the present invention can be understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
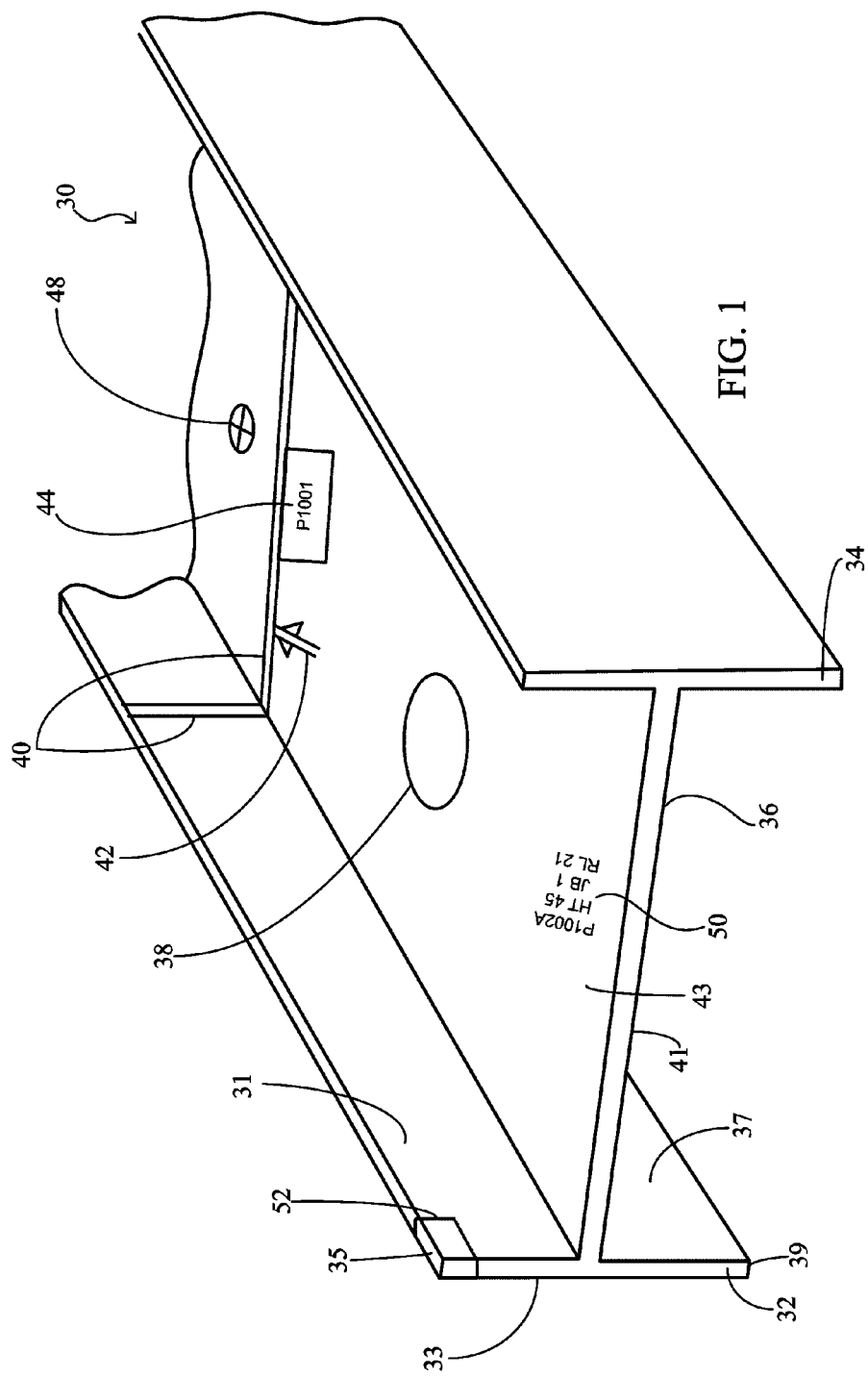
FIG. 1 is a perspective view of a beam having representative markings.

FIG. 1 illustrates a representative beam 30 having a number of representative markings. The beam 30 is a wide flange beam (or I-beam) 30 having twelve external surfaces. The beam 30 includes a top flange 32, a bottom flange 34, and a web 36. The top flange 32 has five surfaces: two inner surfaces 31 and 37, one outer surface 33, and two edges 35 and 39. The bottom flange 34 likewise has five surfaces. The web has two surfaces 41 and 43, making a total of twelve surfaces on the beam 30.

The beam 30 includes a number of representative marks, including, but not limited to, burn marks 52, piece marks 44, weld marks 42, position marks 40, and material specification 50. These marks are merely illustrative samples of a variety of mark types that are commonly placed on beams 30. Referring to FIG. 1, a burn mark, or cut mark, 52 is marked on the inner surface 31, outer surface 33, and edge 35 of the top flange 32 and indicates that a cut is to be made along the burn mark 52. Likewise, a surface 43 of the web 36 includes a burn mark 38, indicating that a hole is to be cut or drilled into the web along this mark 38. Position mark 40 indicates where a separate part will be positioned on the beam 30 during construction or assembly. A piece mark "P1001" 44 indicate the identity of the separate part that will be positioned with the position mark 40. A weld mark 42 indicates the type of weld that should be made to weld the separate beam "P1001" to the beam 30. Additionally, the locating mark 48 identifies the direction from which the separate part "P1001" should come from during assembly in order to position it within the position mark 40. Material specifications 50 are marked on the beam which identifies the beam, its origin, and related delivery and destination information. For example, material specification may include the piece number, "P1002A," the heat number, "HT45," the job number "JB1," and the release number "RL21." Thus, these marks provide construction instructions and beam identification.

Figure 2:
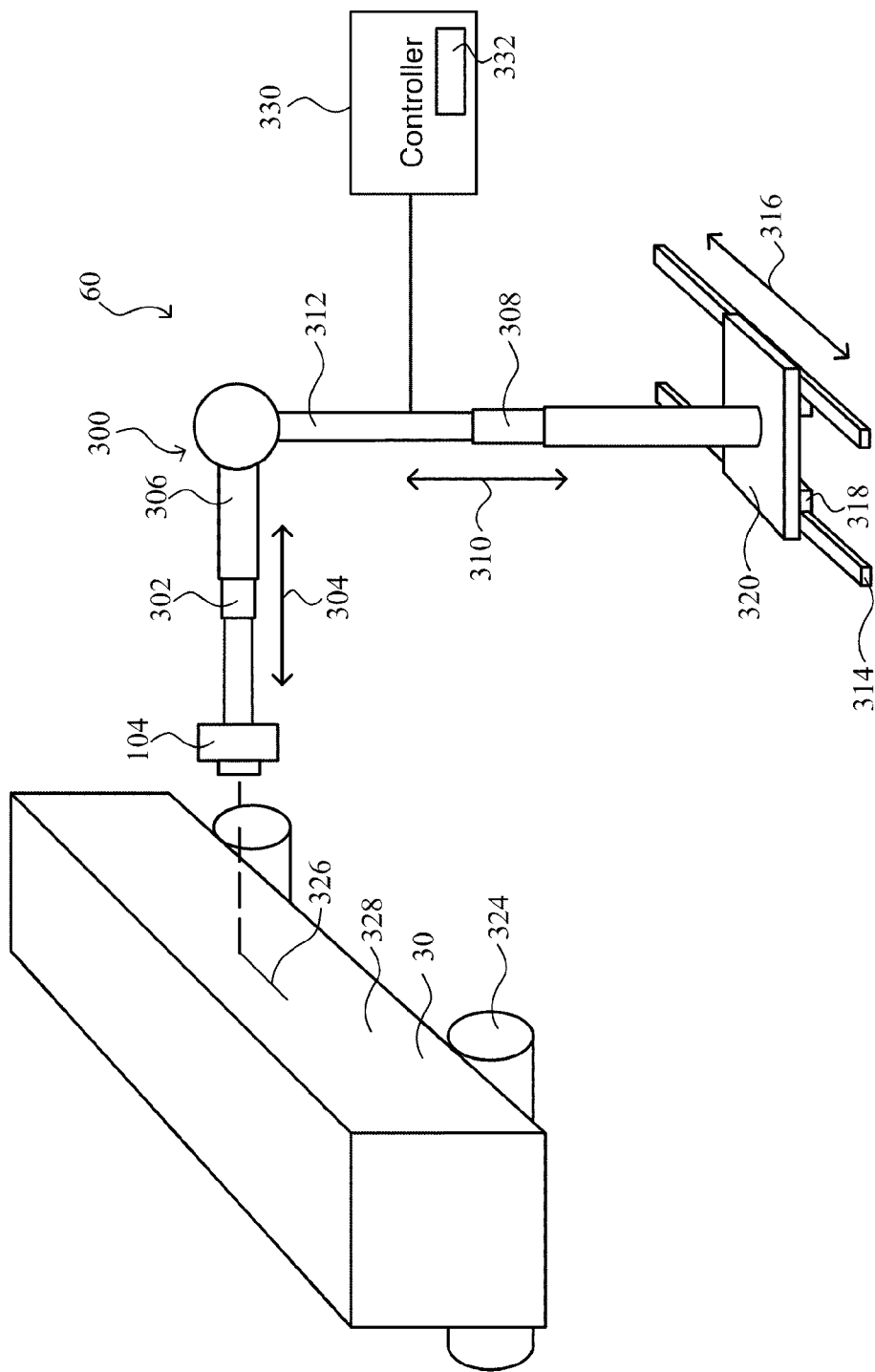
FIG. 2 is a perspective view of a beam marking system marking a beam according to a representative embodiment of the invention.

Reference will now be made to FIG. 2, which depicts a beam marking system 60 comprising a movable arm 300 that is coupled to a beam marking device 104. The movable arm 300 is controlled by the controller 330, which can electronically control the movement of the movable arm 300 and can electronically control the operation of the beam marking device 104. The controller 330 can automate or partially automate the marking process, which can reduce or eliminate marking errors and mark beams 30 more quickly. These potential advantages can permit organizations to reduce or eliminate the labor force historically required to mark beams 30. Thus, while marking historically created a backlogs and delays, using the beam marking system 60, such problem can be eliminated.

In some embodiments, the beam marking device 104 can be configured to mark on the outer surface 328 of a beam 30. The marks 326 made on the beam 30 can include burn marks 52, piece marks 44, weld marks 42, position marks 40, and material specification 50, such as those shown in FIG. 1. Nearly any other types of marks, including designs, images, and text of various fonts can be made using the beam marking device 104. The beam marking device 104 can mark with a laser, plasma, ink, or an etching device.

As shown, in FIG. 1, the beam marking system can include a movable arm 300 that is coupled to and supports a beam marking device 104. In some instances, the movable arm 300 has two or more movable components that collectively move the beam marking device 104 along or about two or more three axes. For example, as shown, the movable arm 300 includes a first arm portion 306 that has a movable component 302 that can move the marking device 104 along a first axis 304, such as an X-axis. In some embodiments, the movable arm 300 includes a second arm portion 312 that has a movable component 308 that can move the marking device 104 along a second axis 310, such as a Y-axis. As shown, the first and second movable components 302, 308 can be telescoping arm portions that selectively extend and retract. Other types of movable components can be used to move the respective arm portions along one or more axes.

In some embodiments, the movable arm 300 includes a third arm portion 320 that has a movable component 318 that can move the marking device 104 along a third axis 310, such as a Z-axis. The movable component 318 can advance the movable arm 300 along one or more tracks 314. The movable components 318 can include one or a set of gears, belts, chains, or other such components. As will be understood, the movable components 302, 308, 318 illustrated in FIG. 2 each only move the marking device 104 along a single axis. It will be understood that other movable components can be incorporated into the beam marking system 60 that move the marking device 104 along or about two or more axis. Such movable members can include ball-in-socket type components that can move about two separate axes simultaneously. Using such movable components could result in a movable like that of FIG. 24, which is described below.

In some embodiments, the controller 330 is configured to controlling the separate or simultaneous movement of the movable components 302, 308, 318. By simultaneously controlling the movable components 302, 308, 318, the controller can move the marking device 104 along and/or about four or more axis simultaneously.

In some embodiments, as shown in FIG. 2, the controller 330 includes a computer program in operable association with the controller. The computer program can receive data corresponding to a beam marking layout and translate the beam marking layout data to machine readable instructions that are readable by the controller. The receipt and processing of this data can be facilitated by one or more user interfaces that are displayed on a display device (not shown). In some embodiments, the computer program permits a technician to control the operation of the machine and input and/or receive data corresponding to a beam marking layout.

Figure 3:
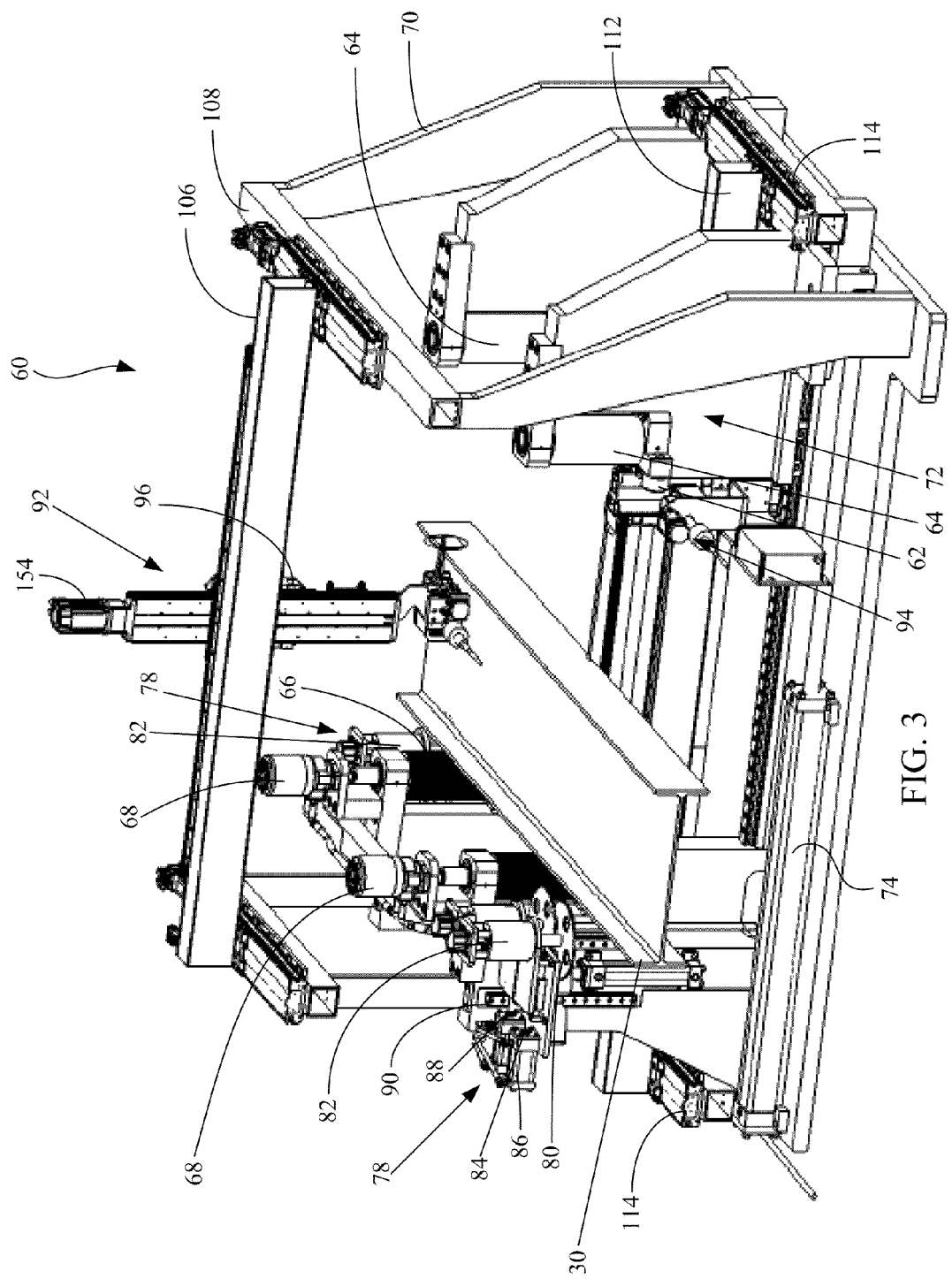
FIG. 3 is a perspective view of a beam marking system according to a representative embodiment of the invention.
Figure 4:
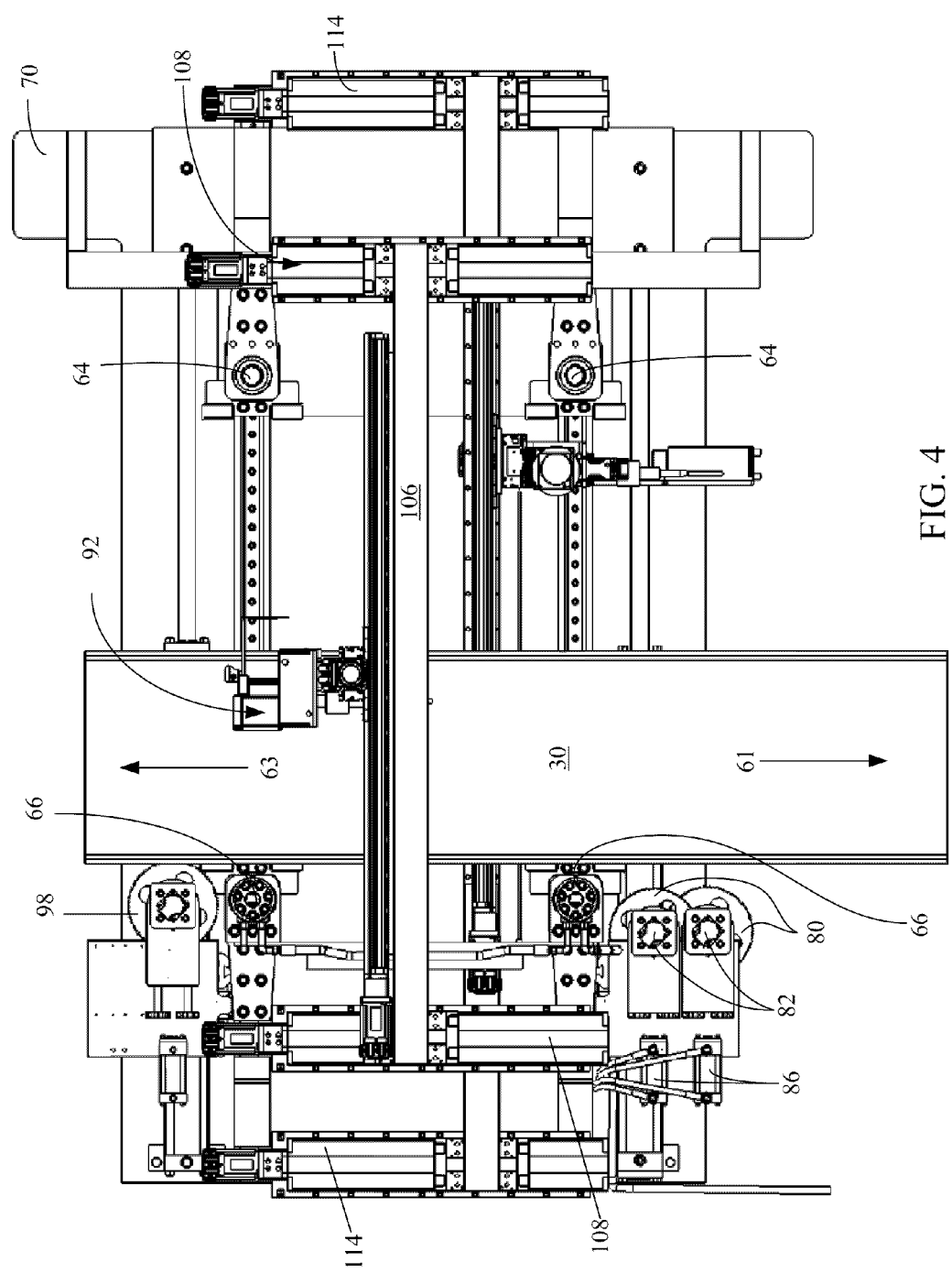
FIG. 4 is a top view of a beam marking system according to a representative embodiment of the invention.
Figure 5:
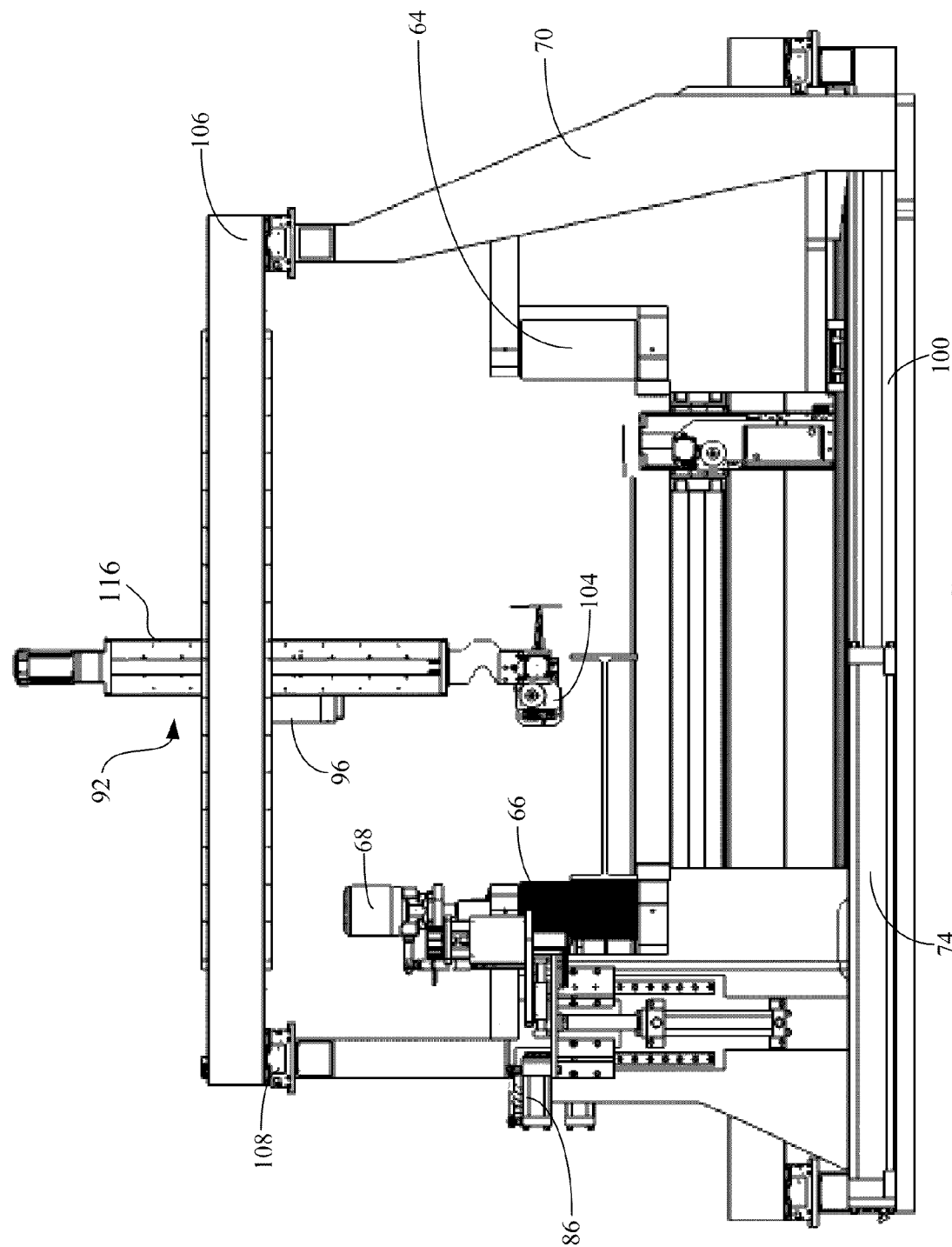
FIG. 5 is a rearward-facing side view of a beam marking system according to a representative embodiment of the invention.
Figure 6:
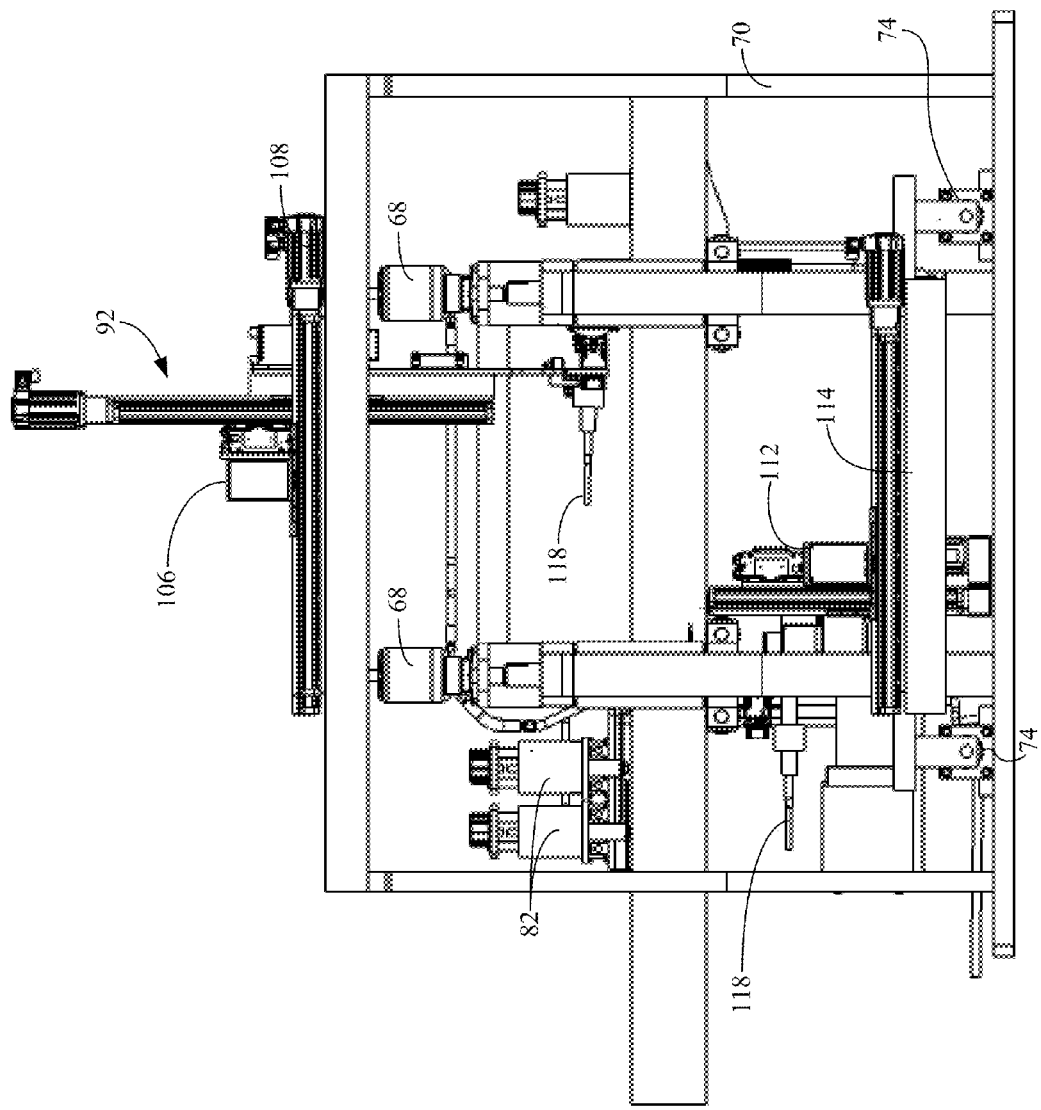
FIG. 6 is a side view of a beam marking system according to a representative embodiment of the invention.
Figure 7:
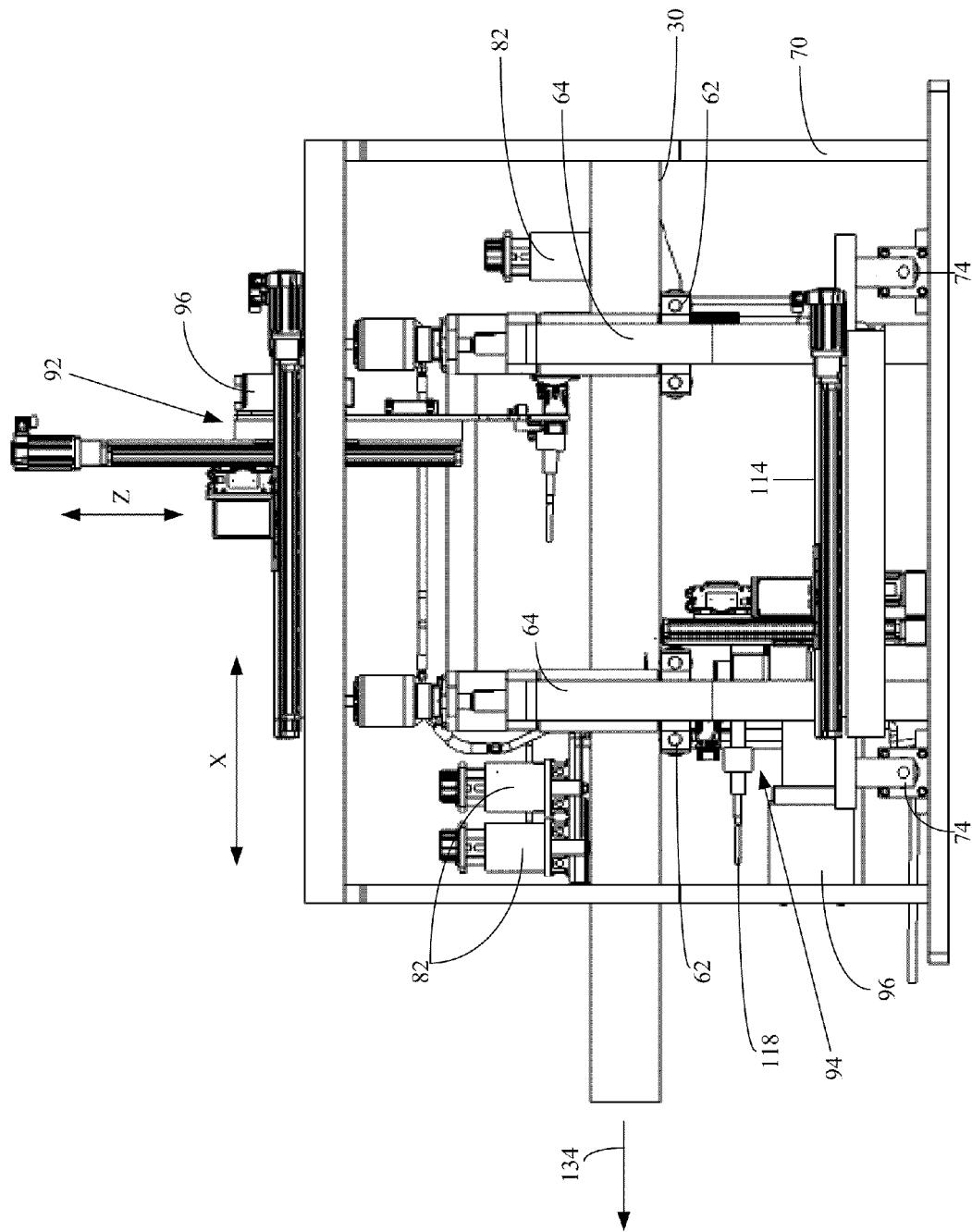
FIG. 7 is a side view of a beam marking system according to a representative embodiment of the invention.
Figure 8:
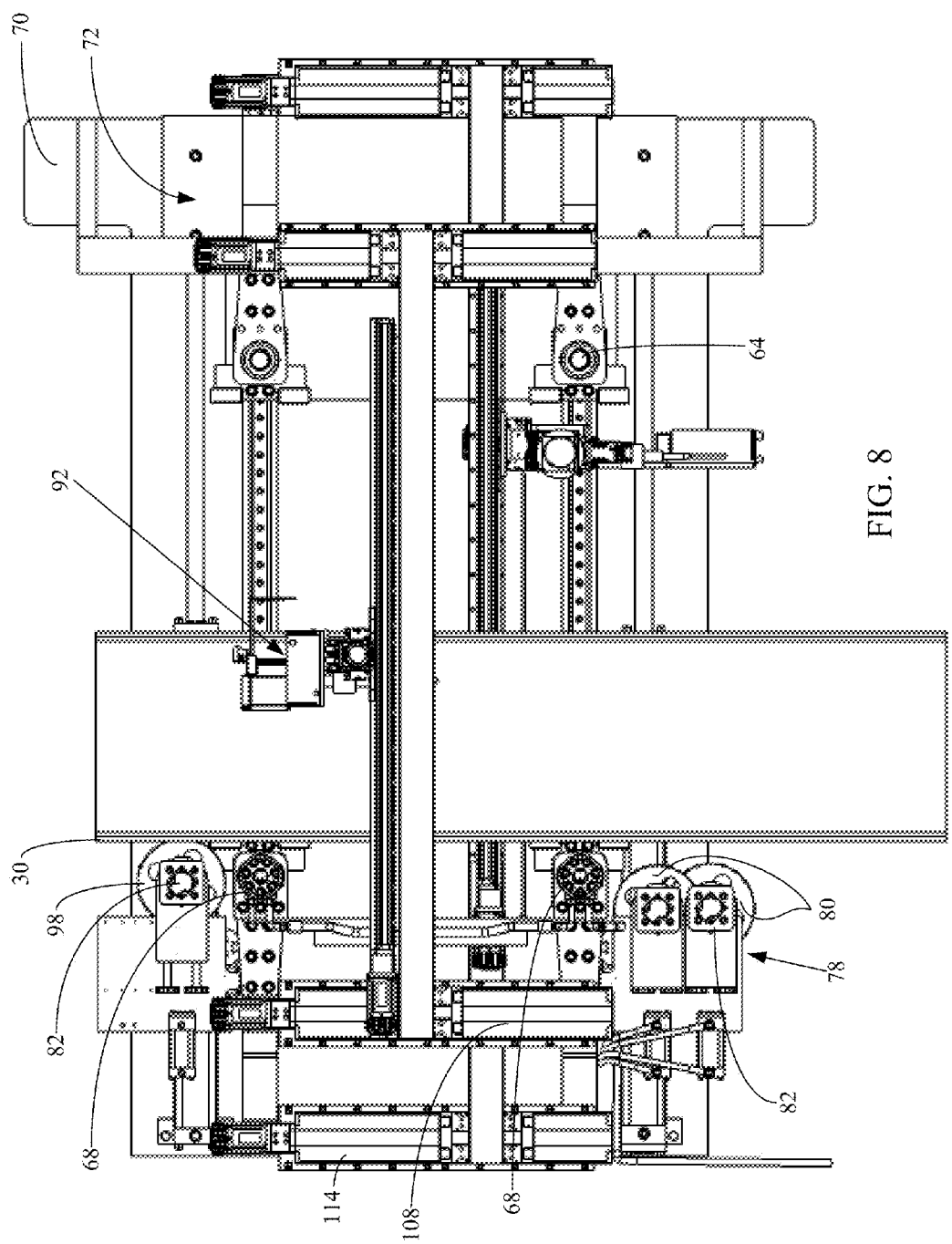
FIG. 8 is a top view of a beam marking system according to a representative embodiment of the invention.

Reference will now be made to FIGS. 3 to 8, which depict various view of a representative embodiment of a beam marking system 60. The illustrated components, systems, and structures are not intended to limit the beam marking system 60, but are presented for the purpose of showing potential embodiments of such a system. As shown in FIG. 3, a beam marking system 60 is illustrated which automatically receives and advances a beam 30 through a chassis 70 and marks the beam using beam marking devices 104 coupled to movable arms 92 and 94. It will be noted, that the beam marking system 60 can be configured to accommodate beams comprising different material types, including metal, wood, plastics, composites, and other beam types. Additionally, the beam marking system 60 can be configured to accommodate various beam types including, wide flange beams, square and rectangular tubing, angle beams (also known as L-beams), C-channel beams, flat stock, and the like.

In some embodiments the beam marking system 60 supports a beam 30 and moves it therethrough so that it can be marked. In some configurations, as a beam 30 is received, it rests on top of a plurality of cam rollers 62, which allow the beam to move freely in a forward direction 61 and a reverse 63 direction. The beam 30 can also be received between drive roller 66 and/or idler rollers 64, which contact the outer horizontal edges of the beam 30. In some embodiments, there are two drive rollers 66 and two idler rollers 64. In other embodiments, there may be more of less drive rollers 66 and idler rollers 64. Idler rollers 64, which are not powered rollers, can be disposed on the movable clamp portion 72 of the chassis 70, which moves towards and away from the drive rollers 66 to accommodate for smaller and larger beam widths. The movable clamp portion 72 moves the idler rollers 64 towards the beam rollers 66 until there is sufficient contact and/or pressure between the beam 30 and the driver 66 and idler 64 rollers for the drive rollers 66 to efficiently move the beam 30 at small or large increments. In some embodiments, the drive rollers 66 are powered by the drive motors 68, which control the movement of the drive rollers 66. In order to mark the beam with a high degree of accuracy, in some embodiments, the beam marking system 60 is configured to move beam 30 through the chassis 70 in a controlled and deliberate manner.

Figure 9:
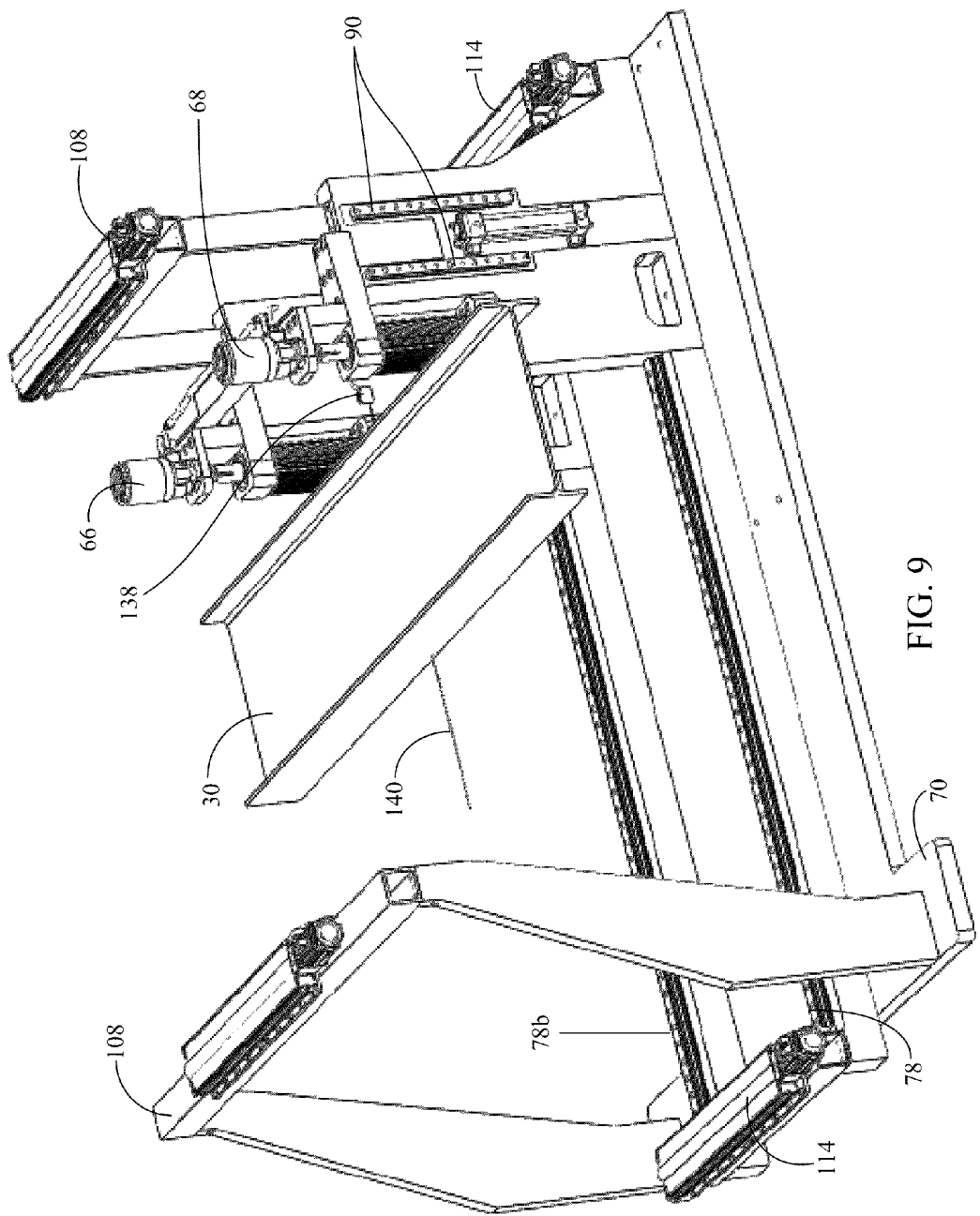
FIG. 9 is a perspective view of a beam marking system without the clamp portion according to a representative embodiment of the invention.
Figure 10:
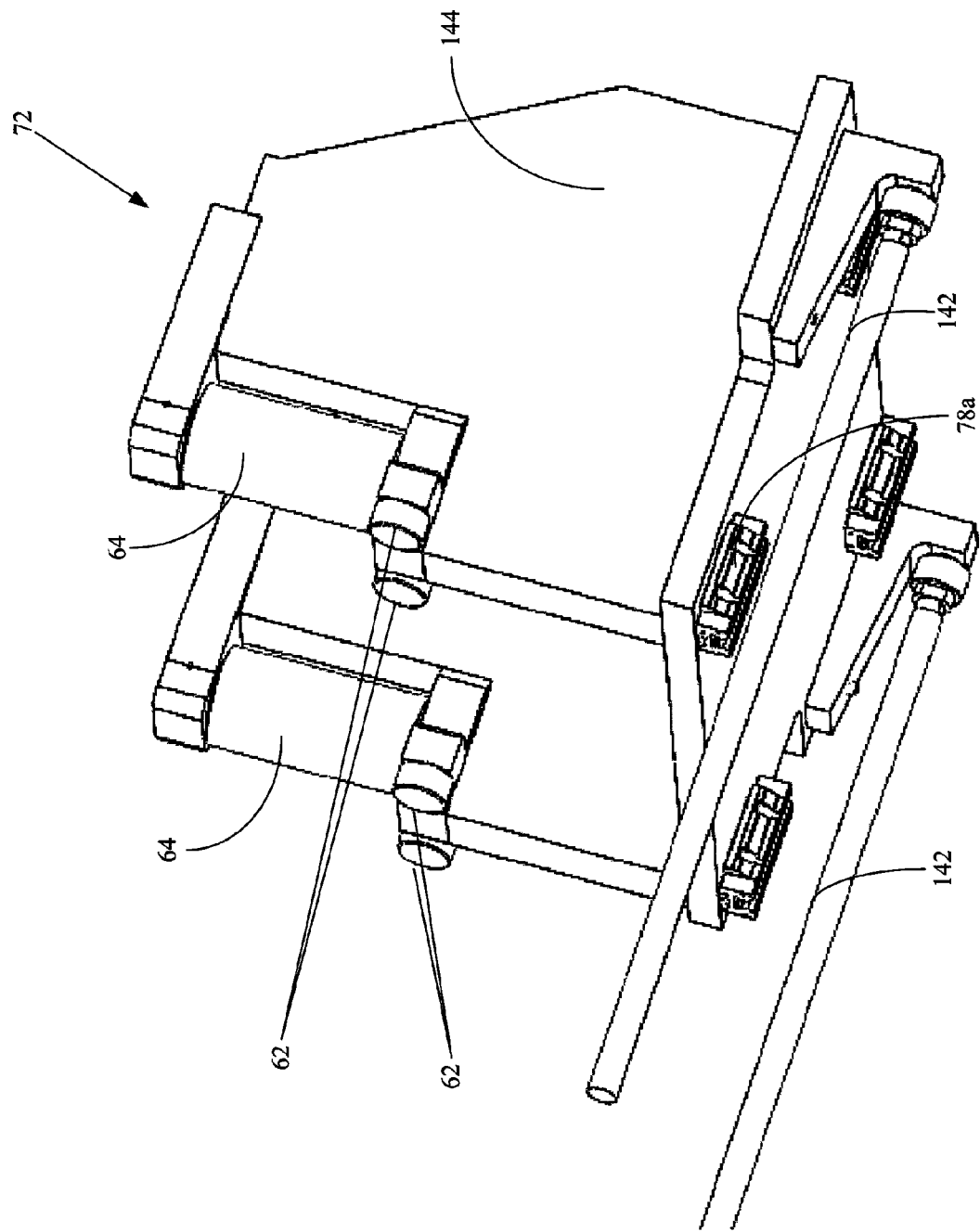
FIG. 10 is a perspective view of a clamp portion of a beam marker according to a representative embodiment of the invention.

Reference will now be made to FIGS. 9 and 10 and the clamp portion 72 of a chassis 70. FIG. 9 illustrates a chassis 70 without a clamp portion 72. FIG. 10 illustrates the clamp portion 72 separately. The clamp portion 72 of the chassis 70 can selectively move towards and away from the drive rollers 66 to grip beams 30 of various sizes therebetween. The clamp portion 72 includes vertical supports 144 on the clamp body which hold the idler rollers 64 and cam rollers 62. In some configurations, one or more rods 142 extend from the clamp body and are received within a hydraulic cylinder 74 of the chassis 70. The hydraulic cylinder 74 can selectively adjusts the positions of the clamp portion 72 on the chassis 70. In some embodiments, the clamp portion 72 includes a slider 78*a* which couples to a slider component 78*b* on the chassis 70. As the hydraulic cylinders 74 adjust the position of the clamp portion 72, the clamp portion 72 can slide along the slider 78 in a uniform manner. Thus, using the clamp portion 72, the beam marking system 60 can clamp a beam 30 between the idler rollers 64 and the drive rollers 66 during the beam marking process to steady the beam 30 and have means for moving the beam in a forward direction 61 and a reverse 63 direction.

Reference will again be made to FIGS. 3 to 8. As the beam 30 advances through the beam marker 60, the beam's 30 advancement is measured and/or tracked by a measuring system 78. In some embodiments, the measuring system 78 includes a series of measuring wheels 98. In some particular embodiment, the measuring system 78 includes one or more infeed measuring wheels 98 and one or more outfeed measuring wheel 80. In some embodiments, the measuring system 78 includes only a single measuring wheel. In some embodiments, the measuring system 78 includes other measuring devices besides measuring wheels. In some instances the measuring system 78 includes one infeed measuring wheel 98 and two outfeed measuring wheels 80.

Accurate beam markings require that all markings be placed at the correct location on a beam 30. This ensures proper beam preparation and assembly. Incorrect placement could result in various assembly problems. Accordingly, the measuring system 78 can track and/or measure the length of the beam 30 as it advances through the chassis 70. Using the tracked and/or measured distances, the controller 330 can determine the dimensions of the beam 30 that are within a mark-able area of the beam marking device 104. Thereafter, the beam marking system 60 can accurately mark the portions of the beam 30 that are within the mark-able area of the beam marking device 104 with the markings that correspond to that area. As a result, the beam marking system 60 can accurately mark the entire beam 30 by advancing it, measuring the advancement, and marking the various portions of the beam as it advances through the beam marker 60.

Figure 11:
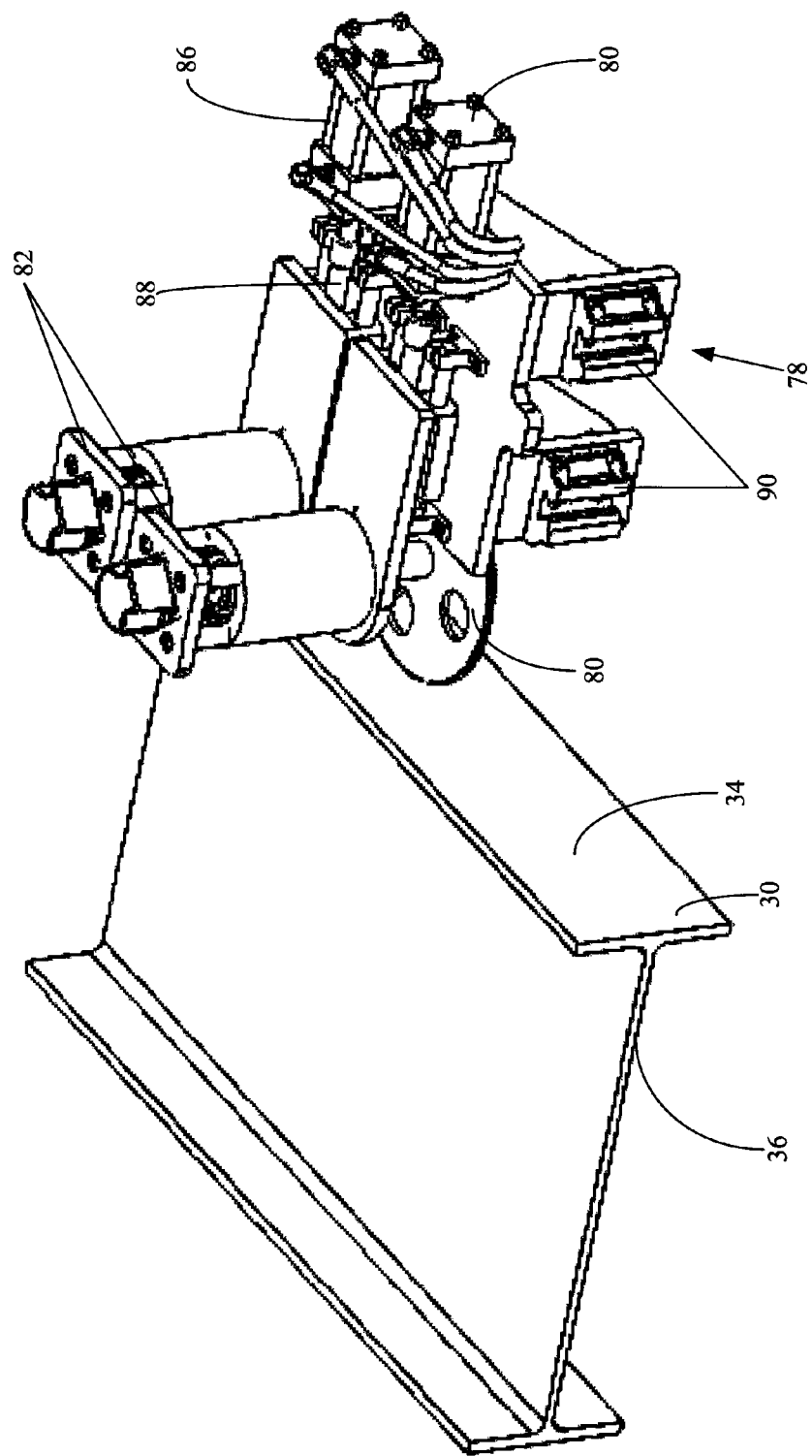
FIG. 11 is a perspective view of a portion of a measuring system of beam marker according to a representative embodiment of the invention.

Reference will now be made to FIGS. 3 to 8 and 10, in which a measuring system 78 is illustrated having a single infeed measuring wheel 98 and two outfeed measuring wheels 80. FIG. 11 illustrates the outfeed portion of the measuring system 78. The illustrated measuring system 78 measures the longitudinal movement of the beam 30 through the chassis 70. As the beam 30 is initially fed through the chassis, the infeed measuring wheel 98 contacts an outer surface of the beam 30. Rough or textured surfaces on the exterior of the infeed measuring wheel 98 provide friction which enables the wheel to grip the outer surface of the beam 30 as it advances, and rotates with this advancement. As the beam advances, the infeed measuring wheel 98 rotates a wheel axis, which is coupled to a wheel encoder 82 that converts wheel rotation to digital signals that are used to measure and/or track the advancement of the beam 30.

In some embodiments, the measuring system 78 is capable of advancing towards and away from the chassis center, and upwards and downwards, in order to accommodate various beam dimensions. For example, in some embodiments, the measuring system 78 is adjusted towards and away from a beam 30 using a lateral adjustment component, such as a pneumatic cylinder 86 and rod 84 or other like component. In some embodiments, this lateral adjustment component maintains the measuring wheel in contact with the beam at a constant pressure. For example, in some embodiments, the lateral adjustment component includes a gas spring 88, which is coupled to the rod 84 and maintains the wheel in constant contact with the beam 30 by applying a constant pressure against the wheel despite bumps or deviations in the wheel's outer surface. In this way, the measuring wheel constantly travels along the beam 30 during beam advancement to provide accurate measurement of the beam's advancement.

In some embodiments, the measuring system 78 includes height adjustors 90, such as a slide system coupled to hydraulic cylinders that raises and lowers the measuring system 78. The height adjustors 90 position the measuring system 78 vertically on the outer surface of the beam 30. In some situations, the beam 30 may have cut out portions, or non-flat surfaces. Accordingly, in these situations the measuring system 78 can be adjusted to an optimal location along the beam 30. For example, with wide flange beams, as shown in FIG. 10, the measuring wheels can be located along the plane of the web where it is less likely that the flange is cut. Thus, the measuring system 78 is capable of multiple adjustment schemes that accommodate various types of beam shapes, structures, and configurations.

Referring again to FIG. 9, in some embodiments, the measuring system 78 includes a laser 138 that projects a laser beam 140 across the chassis 70 and which is configured to recognize when the beam 30 breaks the laser beam 140 to begin measuring the advancement of the beam 30. In some embodiments, the location of this laser 138 is located at a zero point for beam measurement, or the point at which the beam marking system 60 deems to be the start of the beam, in terms of beam advancement. Furthermore, in some embodiments, the laser 138 serves as a redundancy check, for double checking the measurements of the measuring wheels 80 and 98. For example, the distance between the infeed measuring wheel 98 and the laser 138 defines a laser distance. As the beam 30 is initially advanced through the chassis 70, the infeed measuring wheel 98 measures the beam's advancement. When the beam 30 is advanced to a certain distance it breaks the laser beam 140. At this point, the distance calculated by the infeed measuring wheel 98 can be compared to the laser distance to verify the accuracy of the infeed measuring wheel measurements. In this way, the beam marking system 60 can be configured to accurately track the advancement of a beam 30 through the chassis 70 in order to accurately place markings along the beam at correct locations.

In some embodiments, as the beam marking system 60 advances the beam 30 with the drive wheel, the intended beam advancement is calculated and can be recorded and/or stored as an advanced position. This value can be calculated and/or stored in the controller 330 or associate computer components. While the drive wheel advances the beam 30, the beam's advancement is measured by the one or more measuring wheel. In some embodiments, the measuring system includes two or more measuring wheels. The measuring wheels assist to measure the distance of the beam 30 advanced past that measuring wheel. In some instances, the two or more measured values are averaged. This averaging function can be accomplished by the controller 330 or via another processing device to calculate an averaged measured position. This averaged measured position can be continuously or periodically compared with the advanced position to see if the advanced position is accurate. If the advanced position does not equal the averaged measured position, the advanced position can be replaced with the averaged measured position. By frequently comparing these positions, the movement and tracking of the beam 30 can be accurately accomplished to enable very precise marking placement. In some instances, these processes are performed by the controller 330.

Thus far, the structure of the beam marker's 60 drive system and measuring system has been described. An implementation of the operation of a representative beam marking system 60 will now be described for illustration and clarification purposes. This implementation is presented merely for illustrating some of the operation of a beam marking system, according to some embodiments. It will be understood that various modifications can be made to the described operations according to the various different structural modifications described herein. Beam marking begins with the introduction of a beam 30 into the beam marker. Beams 30 may be introduced into the beam marking system 60 via a conveyor system, a system of elevated rollers, or a prior automated device forming part of a larger beam preparation system. As the beam 30 is introduced into the beam marker 60, the clamp portion 72 of the beam marking system 60 is laterally adjusted until the distance between the idler rollers 64 and the drive rollers 66 is approximately the distance of the beam width. At this distance, the drive rollers 66 contacts the outer surface of the beam 30 and advance or draws back the beam 30 as the drive roller 66 is driven by the drive motor 68.

As the beam 30 is advanced into the beam marking system 60 the measuring system 78 projects the infeed measuring wheel 98 toward to beam 30 until the infeed measuring wheel 98 is in contact with the beam and an adequate pressure is applied between the beam 30 and the wheel. The beam 30 is driven further forward 61 until the front surface of the beam 30 breaks the laser beam 140. At this point, in some embodiments, the beam 30 is slowly driven rearward 63 until the laser beam 140 is no longer broken. The beam marking system 60 registers this point as the zero point of the beam 30. The zero point is used as a reference point for all further beam measurements. In some embodiments, at the zero point, the beam marking system 60 is capable of marking on a first portion of the beam 30 using the beam marking device 104. In other embodiments, the beam 30 must be advanced from the zero point before the beam 30 can be scanned.

In some embodiments, the measuring system 78 measures the advancement of the beams 30 using a single measuring wheel 98. In these embodiments, the beam is measured by a single measuring wheel 98 as the beam 30 is advanced. During marking operation, the beam is advanced so that a portion of the beam 30 is marked by beam marking device or scanners 104 with any marks that are designated to be placed on that portion of the beam. The portion of the beam may be the portion of the beam accessible by the movable arm 90 and 92. Once marked, the drive system advances the beam 30 so that the next portion of the beam 30 is accessible to the movable arms 94, 92. Marks are made on that portion and the beam is subsequently advanced. This process is repeated until the beam 30 is completely marked.

In other embodiments, the measuring system 78 measures uses two or more measuring wheels 98 and 80. In some embodiments, when two or more measuring wheels are utilized, each wheel measures the distance of beam advancement, and the measurements are averaged. This averaging process can improve the accuracy of the beam measurements. In some embodiments, the two or more measuring wheels are staggered horizontally and vertically along the wheel to acquire a more accurate sample size. If the difference between the measurements is substantial, a flag can be thrown indicating potential mechanical malfunction. Additionally, if three or more measuring wheels are used, a single measurement that is substantially different from the others can be discarded. Thus, of the measurement system 78 provides a high degree of accuracy, which can be upgraded, checked, and adjusted as needed.

Reference will now be made to FIGS. 3 to 8, which depict the beam marking system 60 including a marking sub-system that comprises one or more beam marking devices that is moved about a beam 30 by one or more movable arms 92, 94. In some embodiments, the marking sub-system includes a laser marker, a plasma-arc marker (or plasma marker), an etching marker, or inkjet markers, each of which can be operated to create markings on the surface of a beam 30, without cutting deep fissures into the beam 30. Thus, in some embodiments, the exposure time, power level, speed, and/or other characteristics of the beam marking devices are controlled to avoid damaging the beam 30 using the beam marking device.

In some embodiments, a movable arms 90, 92 can include two or more movable components, such as hinges, joints, pivoting mechanisms, actuators or hydraulic presses moving the arm along a track or slide, etc. that collectively move the beam marking device into a position on or about a beam 30 where it can mark the beam 30. As shown in FIGS. 3 to 8, a top movable arm (referred to collectively as numeral 92) includes two actuators and two tracks 109 that move the beam marking device 104 along an X axis, and two X-axis supports 108. An actuator 154 moves the beam marking device 104 along a track 155 of the Y axis, and a Y-axis support 106. An actuator 154 moves the beam marking device 104 along a track 126 of the Z axis, and the Z-axis support 110. And a θ pivot mechanism moves (or pivots) the beam marking device 104 about a θ axis, and about a θ pivot point 122. Thus, as shown, the top movable arm can includes four movable components that collectively move the beam marking device 104 along or about these four axes. In this example, the top movable arm 92 includes four movable components (i) the combination of the set of actuators 154 and the set of tracks along the X-axis support 108, (ii) the combination of the actuator 154 and the tracks along the Y-axis support 106, (iii) the combination of the actuator 154 and the tracks along the Z-axis support 110, and (iv) the θ pivot mechanism. These four movable components collectively move the beam marking device 104 along or about four axes, to position the beam marker 104 at a position within the mark-able area of the beam 30. With these collective movements, the beam marking device 104 can be directed at each of the surfaces on the top and sides of the beam 30, as shown in FIGS. 13 to 18.

Furthermore, as shown in FIGS. 13 to 17, the top movable arm 92 can include a β pivoting mechanism that pivots the beam marking device 104 about a β axis. Thus, in some configurations, a movable arm 92 moves the beam marking device 104 along or about five axes. In other instances, the movable arm 92 moves the beam marking device 104 along or about six or more axis axes, which can be done via the addition of one or more movable components.

In some embodiments, one or more beam marking devices 104 are disposed on one or more movable arms to mark the beam 30. The one or more movable arms 92, 94 can moves the beam marking device 104 to positions on or near a mark-able area of the beam 30 where markings are needed. The size of the mark-able area can vary depending on the range of motion movable arms 92. The space on a beam 30 in which the one or more movable arms are capable of marking on is herein referred to as the "mark-able area." The mark-able area may include areas on more than one surface of the beam. For example, a mark-able area may include each of the sides of the beam 30 illustrated in FIGS. 13-17. After the mark-able area is marked, the beam 30 is advanced so that the next portion of the beam 30 to be marked is located within the mark-able area.

As previously referenced, a wide flange beam, such as the illustrated beam 30, has twelve outer surfaces that can receive a mark. In some embodiments, the beam marking system 60 consists of only a single movable arm, which is moved about the beam 30 to mark on all of the beam's outer surfaces. In some embodiments, such as those illustrated, the beam marking system 60 comprises two movable arms 92 and 94, each of which is assigned to mark specific surfaces of a beam 30. For example, the top movable arm 92 may be assigned to mark on the top and side surfaces of a beam 30, such as the two top flange inner surfaces, two flange outer surfaces and two top flange edges, and top web surface of a wide flange beam, as illustrated in FIG. 1. The bottom movable arm 94 may be assigned to mark to the bottom surfaces of the beam 30, such as the two bottom inner flange surfaces, two bottom flange edges, and the bottom web surface, again as illustrated in FIG. 1. Alternatively, the bottom movable arm 94 may be assigned to mark the two flange outer surfaces either solely or in combination with the top movable arm 92. Accordingly, the beam surfaces may each be assigned to a beam portion, such that each movable arm is assigned to mark a beam portion. In some instances, one or more surfaces may be shared by two or more beam portions. In other embodiments, the beam marking system 60 comprises two movable arms 92 and 94, but each movable arm is capable of marking all or nearly all the surfaces of a beam, and not specific surfaces are assigned to a specific arm. In still other embodiments, the beam marking system 60 comprises three or more movable arms, such as three, four, five, six, seven, or eight movable arms, which enables more rapid beam marking and less movable arms.

Figure 12:
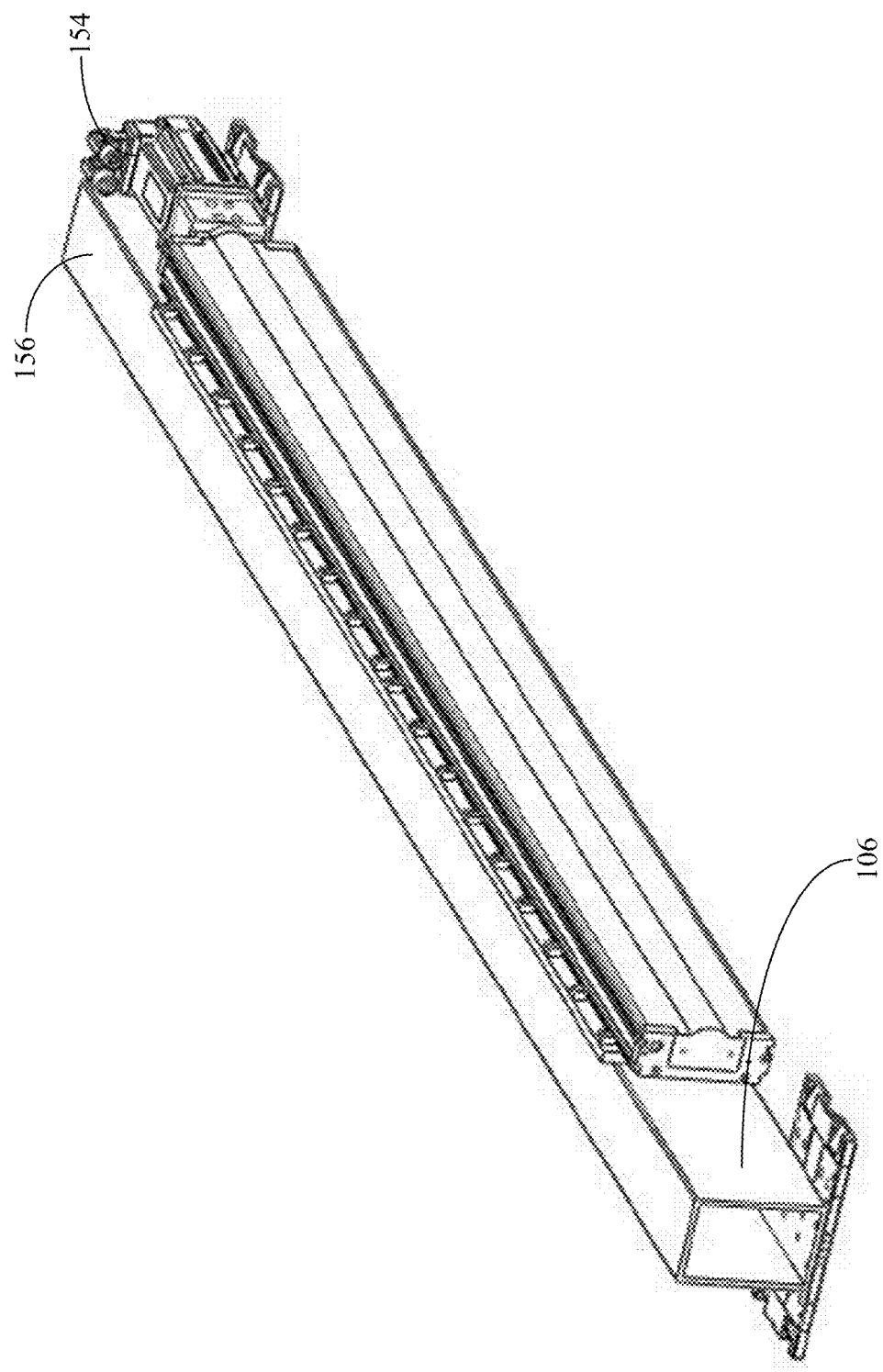
FIG. 12 is a perspective view of an axis support of a beam marker according to a representative embodiment of the invention.

FIGS. 2-7 illustrate a representative beam marking system 60 embodiments having a top 92 and bottom 94 movable arm, each comprising one or more X-axis supports 108, 114, one or more Y-axis supports 106, 112, and one or more Z-axis supports 110, 116. In some embodiments, a beam marking device 104 is disposed on an end of the Z-axis support 110, 116. FIG. 12 illustrates a detailed view of a representative embodiment of the Y-axis support. As illustrated, the Y-axis support 106 includes a beam 156 and an actuator 154, which couples to the Z-axis support and moves the Z-axis support 110 along the Y-axis via the track 155. Various types of tracks 155 and actuators 154 can be utilized on the X, Y, and Z supports.

Figure 13:
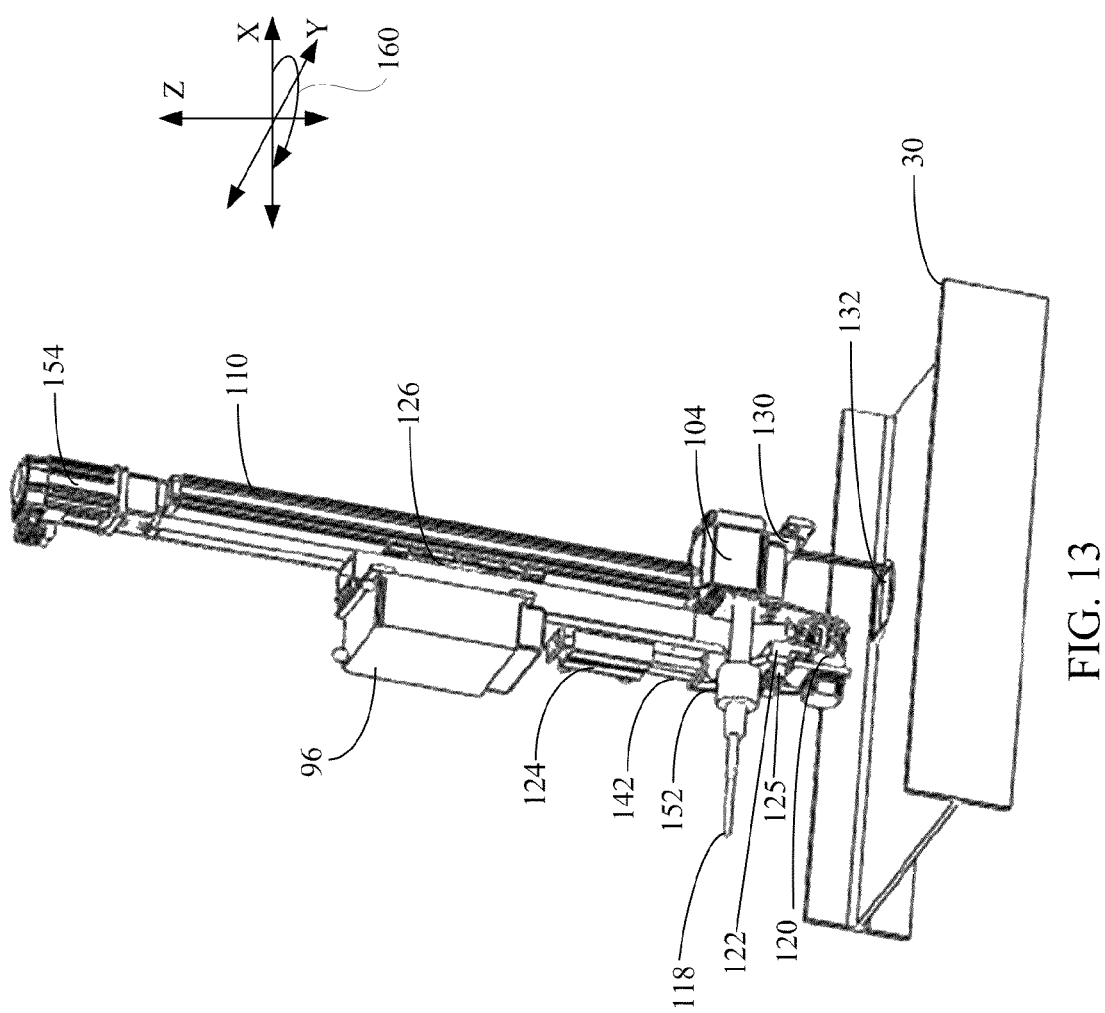
FIG. 13 is a perspective of view a portion of movable arm of a beam marker according to a representative embodiment of the invention.
Figure 14:
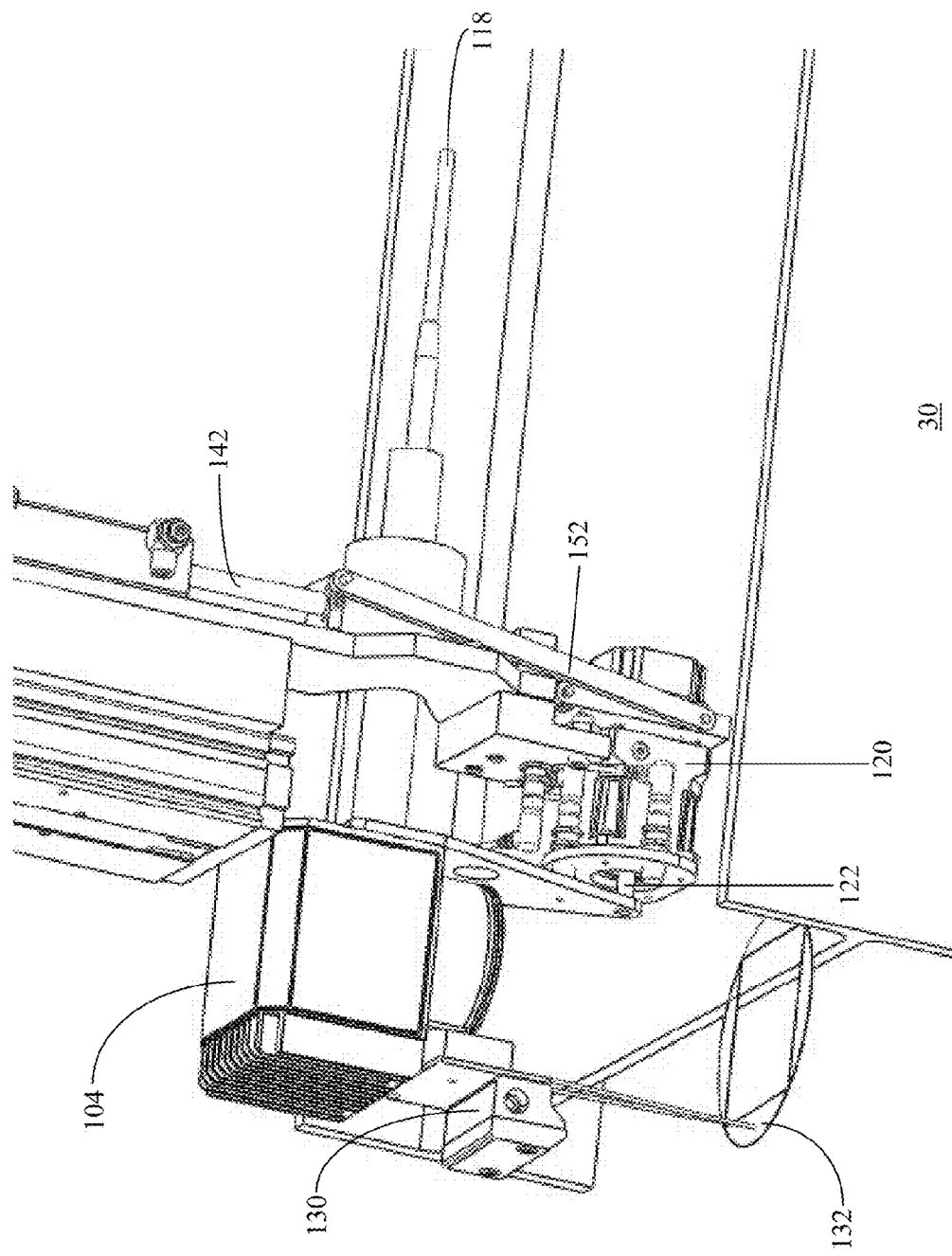
FIG. 14 is a perspective view of a portion of beam marking device according to a representative embodiment of the invention.
Figure 15:
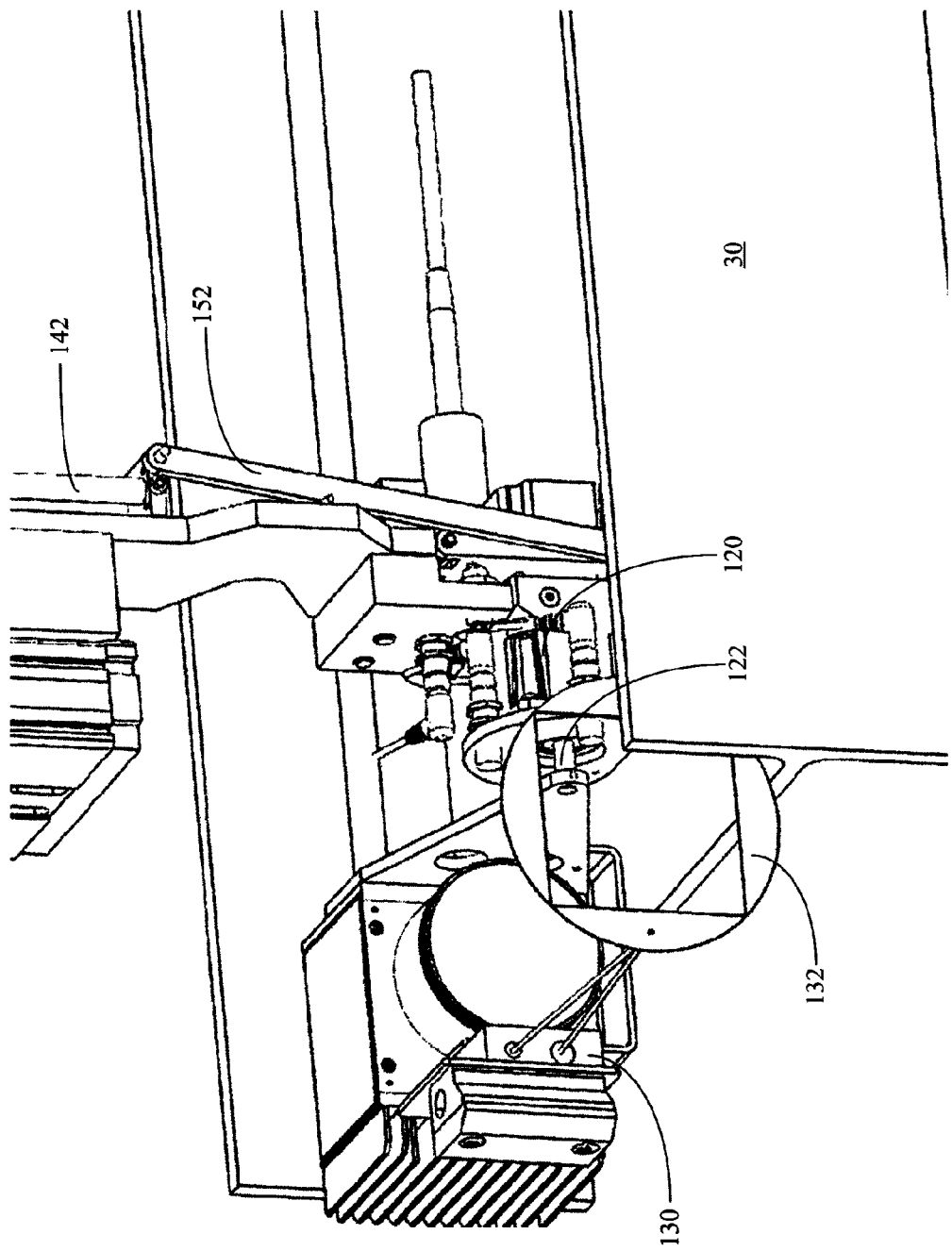
FIG. 15 is a perspective view of a portion of beam marking device according to a representative embodiment of the invention.
Figure 16:
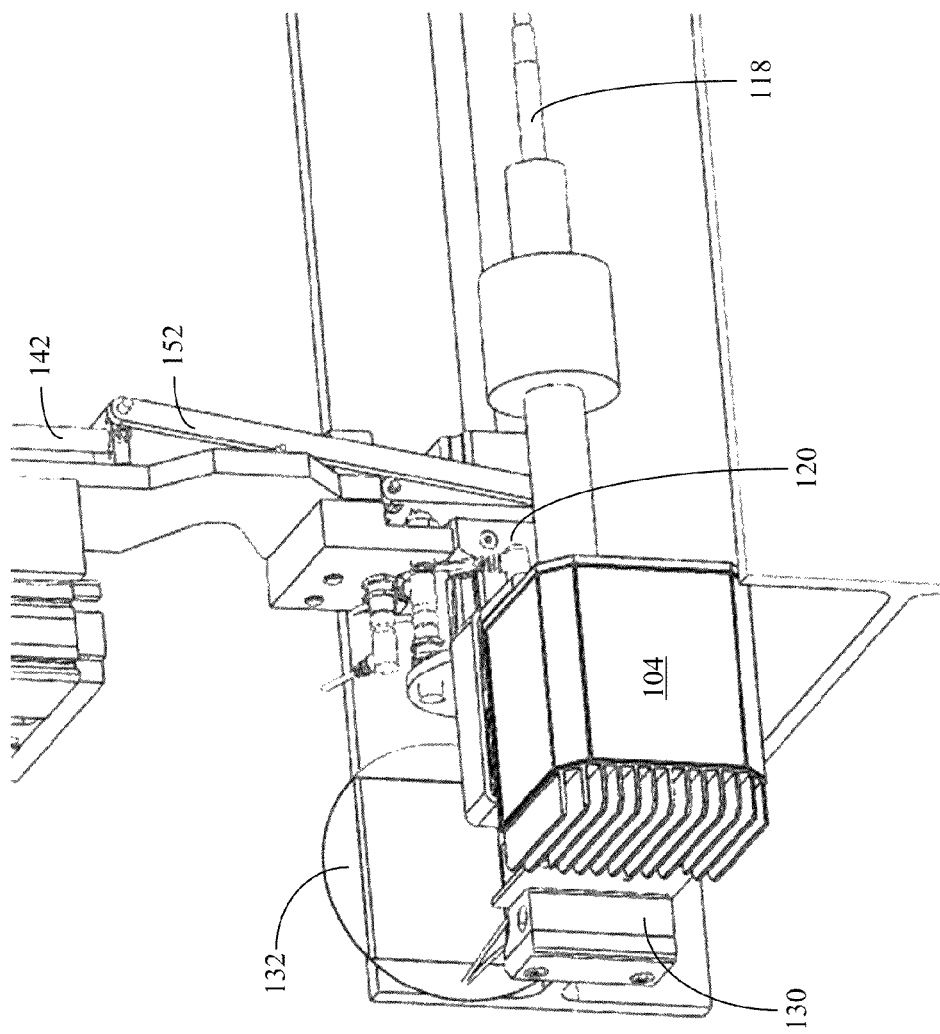
FIG. 16 is a perspective view of a portion of beam marking device according to a representative embodiment of the invention.
Figure 17:
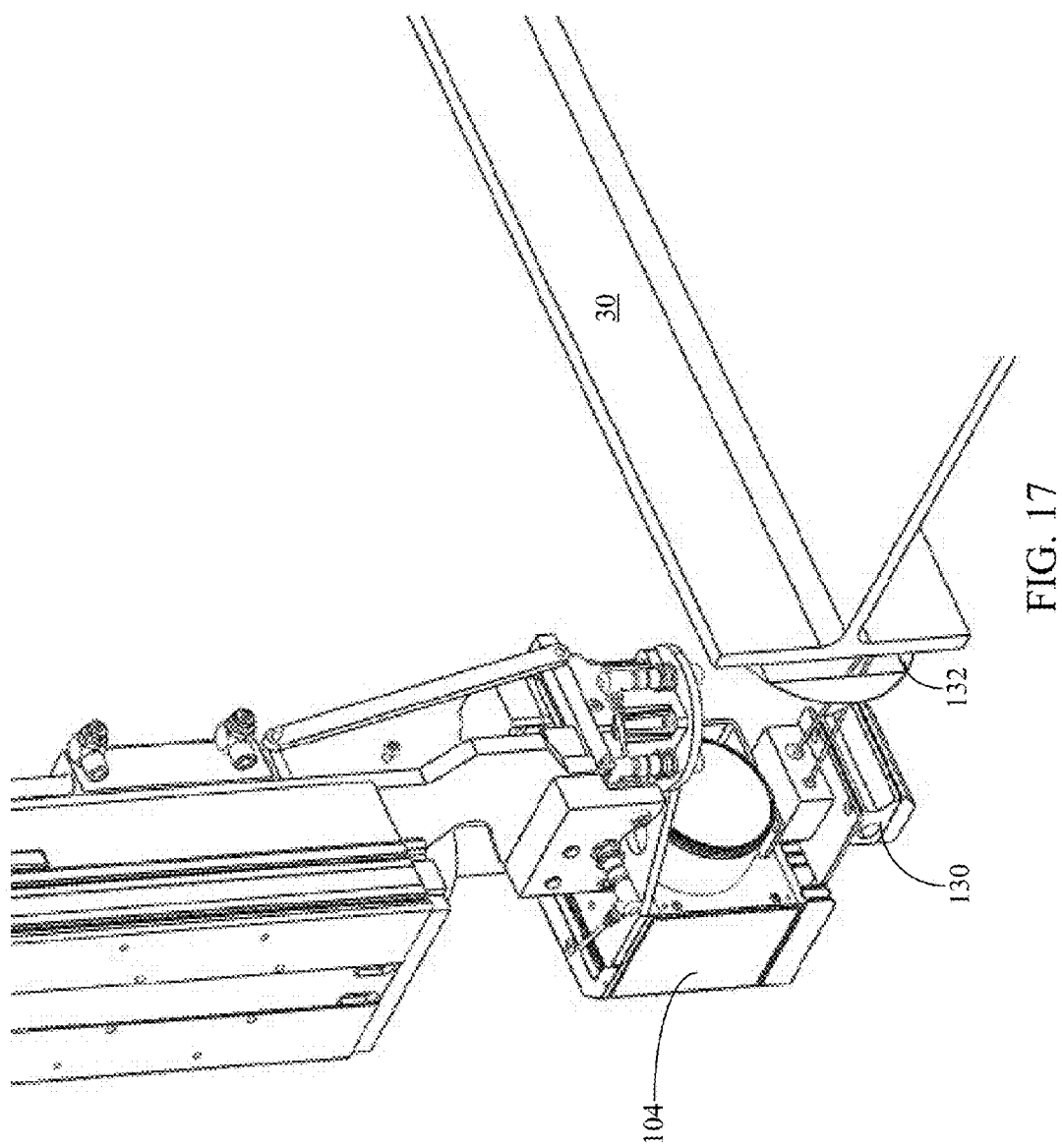
FIG. 17 is a perspective view of a portion of beam marking device according to a representative embodiment of the invention.

Reference will now be made to FIG. 13, which a portion of a movable arm 92 is illustrated comprising a Z-axis support 110 with a Z-axis slide 126. The beam marking device 104 is moved along a track/slide 126 of the Z-axis support 110 in response to an actuator 154. As shown, the beam marking device 104 is a laser marker that has a scanning field 132, a laser light source 96, a laser light input 118, a θ pivot mechanism 120, a β pivot mechanism 124, and a focus finder 130. In some embodiments, the entire movable arm 92 also comprises the Y-axis support 106 and the X axis support 108. Accordingly, in some embodiments, the movable arm 92 collectively moves the beam marking device 104 along the X, Y, and Z axes and about the θ, and β axes. In other embodiments, the movable arm 92 is movable along or about additional or alternative axes.

As illustrated, in some embodiments, a movable arm 92 includes a θ pivot mechanism 120 that is coupled to the beam marking device 104 and pivots the scanner around a θ pivot point 122 so that the beam marking device 104 can be aimed at each of the various outer surfaces of a beam 30 on a top portion of the beam 30. This includes the sides of the beam 30. This movement is illustrated in FIGS. 13-17, which depict the top movable arm 92 articulating along the various directions of movement in order to aim the beam marking device 104 at each surface of a top portion of the beam 30. These movements are initiated primarily by the θ pivot mechanism 120. The β pivot mechanism 124 pivots the beam marking device 104 around a β pivot as an actuator 124 extends and retracts an actuator rod 142 that is coupled to the θ pivoting mechanism 120 by an arm 152.

Rapid beam 30 marking is enabled and facilitated by the use of a beam marking device 104, and particularly with the use of a laser marking device 140. Laser marking devices quickly scan a laser beam over a portion of a beam 30 within a scanning field 132 to permanently discolor the surface of beam 30 scanned by the laser beam. The use of laser scanning in beam 30 marking enables automated beam marking to be feasible because it is much faster than prior marking techniques and therefore it does not produce large backlogs in the beam 30 preparation process. In addition to increasing the speed of marking, the use of a laser marking device enables the laser marker 60 to mark more surfaces than can be marked using prior marking tool. For example, a laser marking device can mark the entire outer surface of a spherical ball or a round beam, which may be difficult for other beam marking devices such as an etching device. Because the laser marking device can send out narrow beams of laser light, it can scan into narrow indentations, concave and convex exterior surfaces and all other surfaces reachable by the laser beam.

Furthermore, laser marks, when marked with a laser of appropriate power do not generally score the beam 30, which creates undesirable weak points in the beam 30. Additionally, lasers scanners can mark all beam types from wood, to metal, plastic, ceramics, simply by increasing or decreasing the beam power to an appropriate level. Harder surfaces, such as metals require a hotter, more powerful beam, while softer surfaces require a less powerful beam. Accordingly, in some embodiments, the beam marking device 104 comprises a 50 Watt pulsed beam laser. In other embodiments, the beam marking device 104 comprises a 100 Watt pulsed beam laser. Likewise, other embodiments may include a beam marking device 104 includes up to a 500 watt pulsed beam laser. Still, in other embodiments, lower powered lasers are utilized, such as 10 Watt or 25 Watt pulsed beam lasers. In yet other embodiments, non-pulsed beam lasers are utilized.

Accordingly, in some embodiments, a movable arm 92, 94 includes a beam marking device 104 disposed on or near the distal end of the movable arm 92, 94. In some embodiments, the beam marking device 104 receives and projects a laser beam received from a laser source 96 via an input cable 118. In some embodiments, the position and/or orientation of the beam marking device 104 is adjusted to focuses it within a scanning field 132. These positions can be facilitated using a focus finder 130, which identifies the distance between the beam marking device 104 and the beam 30 so that the beam marking device 104 is moved to an optimal distance away from the surface of the beam 30. Once in position, the beam marking device 104 marks all marks within the scanning field 132 and is then moved by the movable arm to other locations that need to be marked within the mark-able area of the beam 30. Once the entire mark-able area is marked with all marks corresponding to that area the beam is advanced through the chassis 70 until the next portion of the beam that requires marking is positioned within the scanning area.

Figure 18:
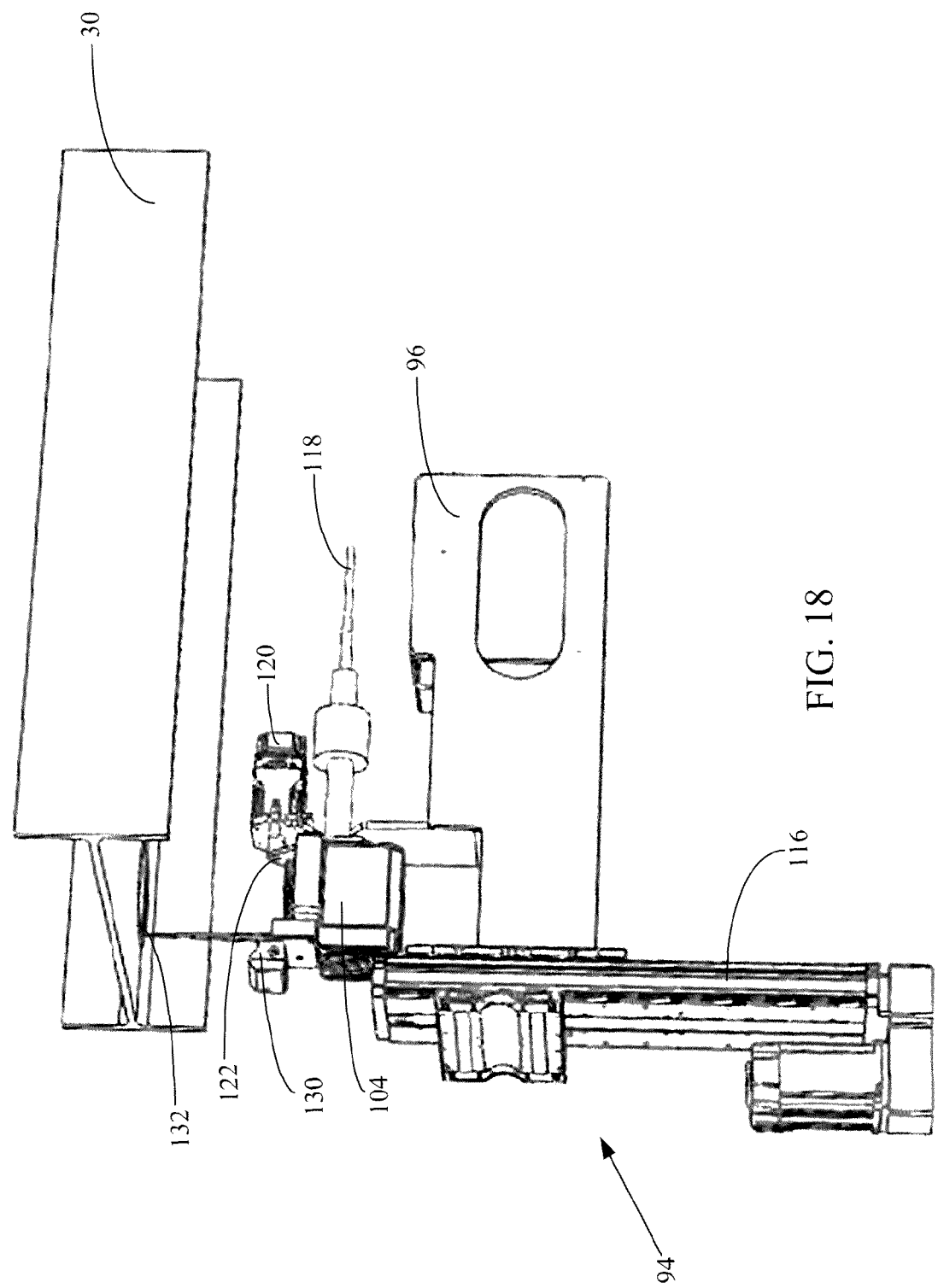
FIG. 18 is a perspective view of a portion of movable arm of a beam marking device according to a representative embodiment of the invention.
Figure 19:
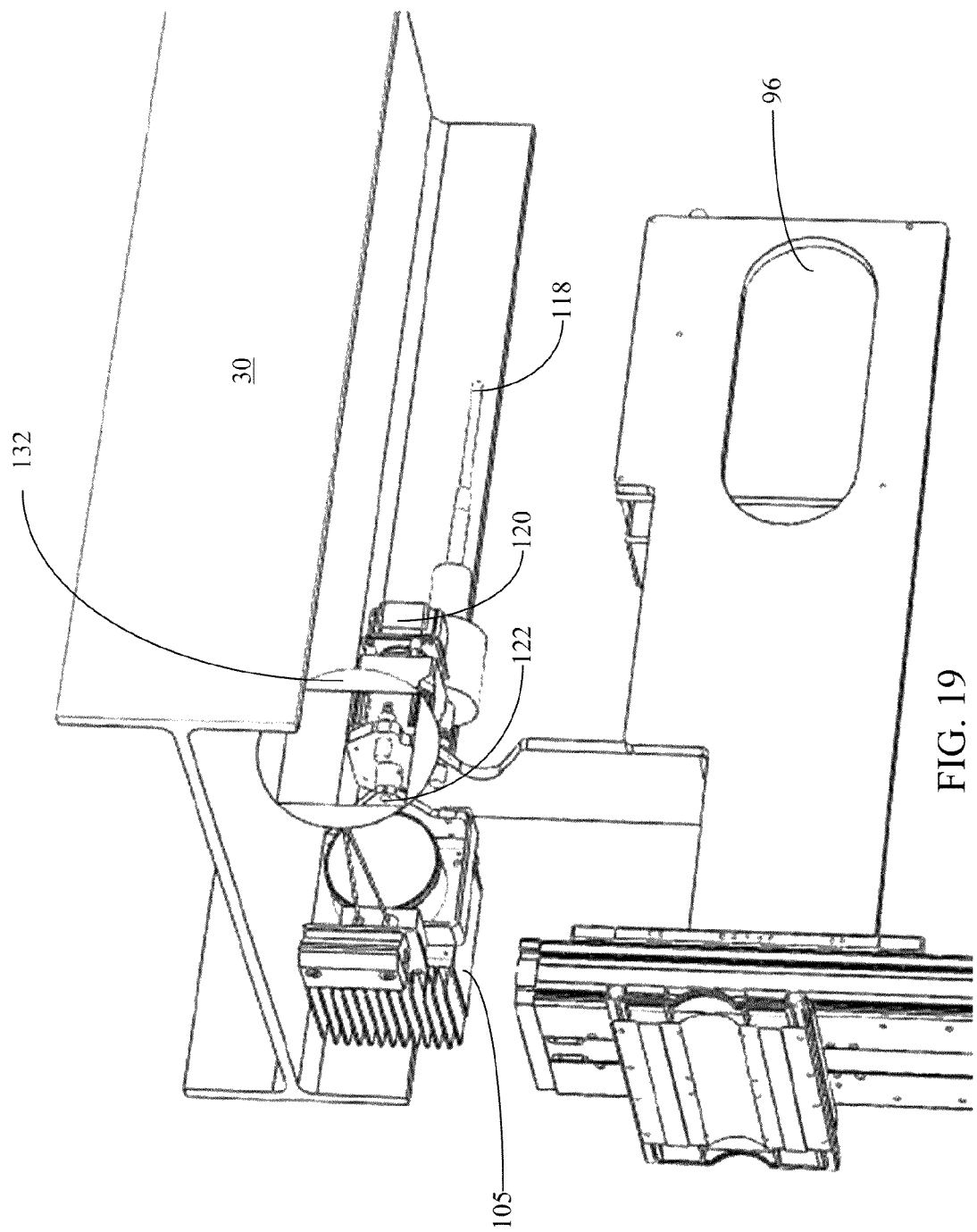
FIG. 19 is a perspective view of a portion of beam marking device according to a representative embodiment of the invention.
Figure 20:
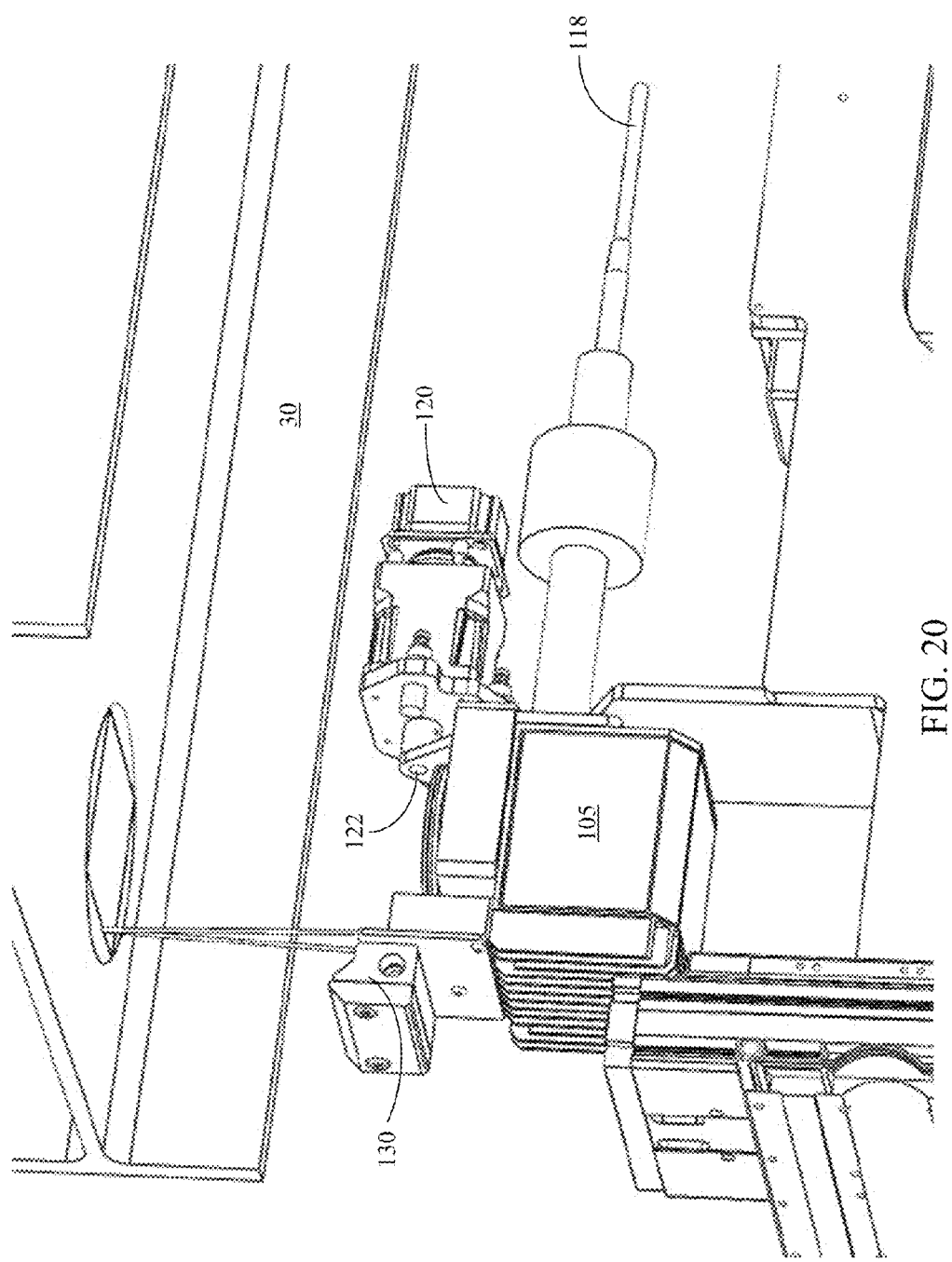
FIG. 20 is a perspective view of a portion of beam marking device according to a representative embodiment of the invention.
Figure 21:
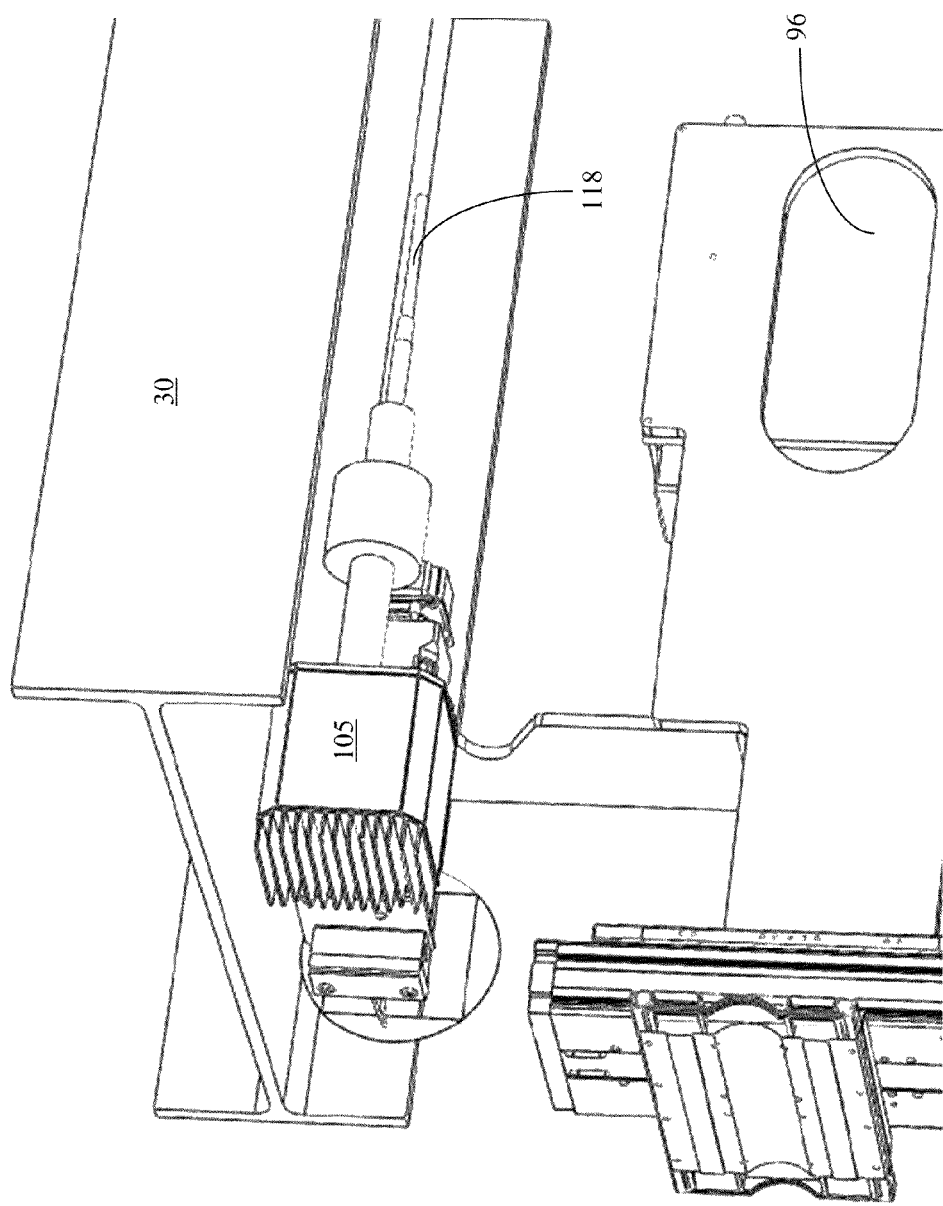
FIG. 21 is a perspective view of a portion of beam marking device according to a representative embodiment of the invention.

Referring now to FIG. 18, which illustrates a portion of a movable arm 94 having two movable components that move the beam marking device 104 along a Z axis and about a θ axis. In some embodiments, this movable arm is the lower movable arm 94, shown in FIG. 3, which is configured to mark on the bottom surface of the web and the bottom edges and the inner portions of the flanges of a wide flange beam 30, as illustrated in FIGS. 18-21. In some embodiments, this portion of a movable arm 94 is coupled to an X-axis support 114 and a Y-axis support 112 beam, in a similar to that of the top movable arm 92. In this manner, the movable components of this movable arm 94 can collectively move the beam marking device along or about at least four axes. Thus, the movable arm 94 functions substantially similarly to the movable arm of FIG. 13, but it has no β pivot mechanism 124 to move the movable arm about the β axis.

Figure 22:
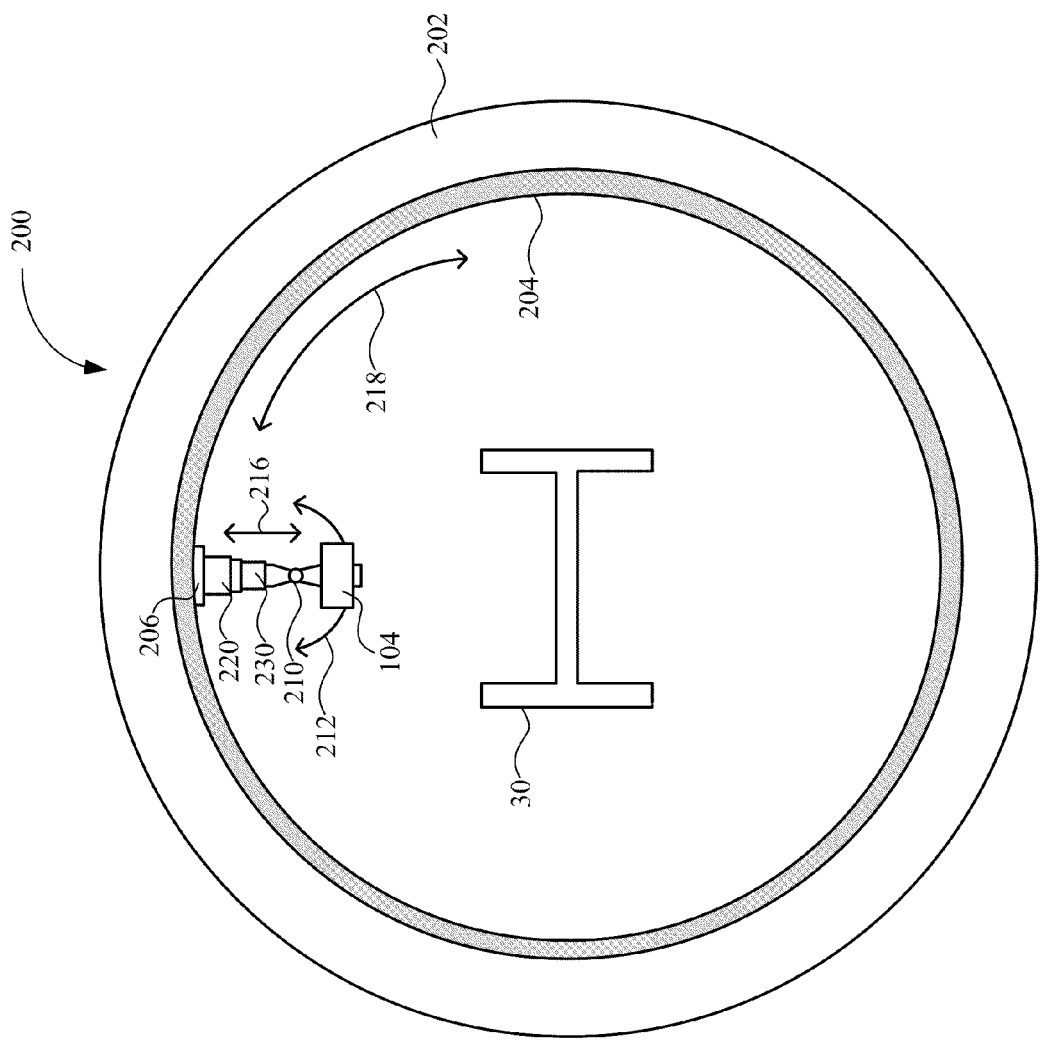
FIG. 22 is a front view of a movable arm and beam marking device according to a representative embodiment of the invention.

Referring now to FIG. 22, which illustrates another embodiment of a movable arm 200. In some embodiments, this movable arm 200 is positioned around a beam 30. The movable arm 200 includes a support 202 that at least partially circumscribes a beam 30 as it is advanced through the beam marking system 60. In some embodiments, the support 202 is circular (as shown), C-shaped, oval or elliptical-shaped, square-shaped, rectangular, or has other shapes that at least partially circumscribes the location of the beam 30. The support 202 comprises a track 204 disposed on the support 202. In some embodiments, the support 202 does not completely circumscribe the beam 214, but partially circumscribes the beam 214, as with a C-shaped support 202.

In some embodiments, as shown, a beam marking device 104 is disposed on the distal end of an arm extension 220 that moves around the support 202, such as on the track 204. In some embodiments, the arm extension 220 includes a movable component 230 selectively extends and retracts along a longitudinal axis 216 to move the beam marking device 104 towards and away from the beam 30. The arm extension 220 can be coupled to the track 204 via a coupler 206. In some embodiments, the movable arm 202 further includes a moveable component that moves the movable arm 200 along an X axis, such as one or more X-axis support 108 having actuators and tracks, as previously described.

To facilitate laser marking of each exterior surface of the beam 214, the movable arm 202 may include two or more directions of movement and may move along or about two or more axes. In some embodiments, the arm extension 220 includes a pivoting mechanism 210 that pivots the beam marking device 104 about one or more axis. In some embodiments, the pivoting mechanism 210 pivots the arm extension 220 about two or more axis (similar to a ball-in-socket joint) to aim the beam marking device 104 at different external surfaces of the beam 214 and/or to adjust beam marking device 104 to be oriented approximately normal to the to-be-marked surface.

Figure 23:
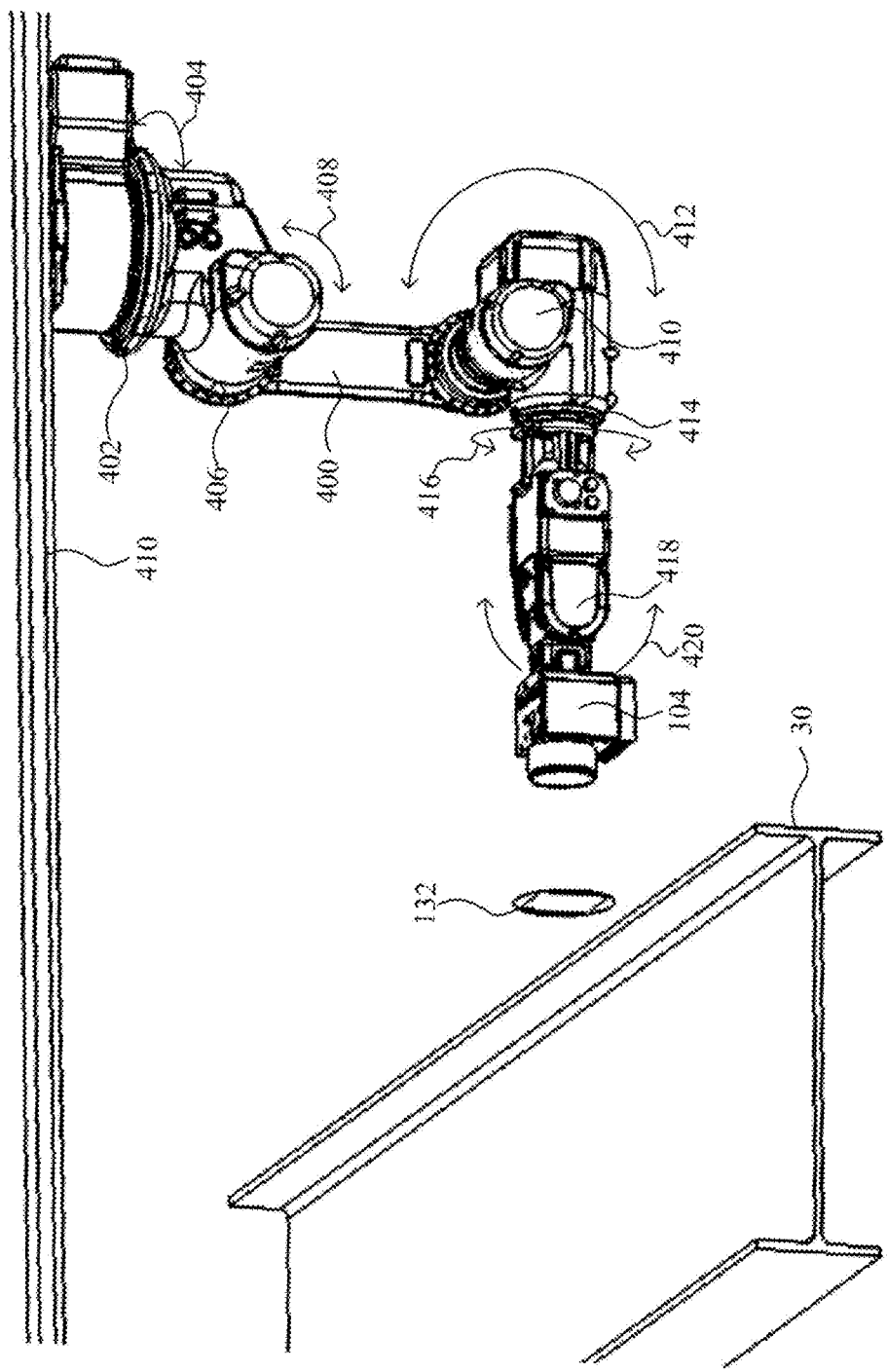
FIG. 23 is a perspective view of other movable arms and a beam according to a representative embodiment of the invention.

Reference will now be made to FIG. 23, which depicts another embodiment of a movable arm 400. As shown, in some embodiments, the movable arm 400 is coupled to a support 410, such as a chassis, at a single connection point. The movable arm 400 is configured to articulate, as a robotic arm, to position the beam marking device 104 in position to mark the beam 30. This movement can be controlled by a controller 330 in electronic communication with the movable arm 400. As shown, in some embodiments, the movable arm has five movable components 402, 406, 410, 414, 418. Each of these movable components can move the beam marking device along or about at least one axis. For example, the movable component 418 closest to the beam marking device 104 can move the beam marking device 104 about an axis, in a direction marked as 420. Moving away from the beam marking device 104, the next illustrated movable component 414 can move the beam marking device 104 about an axis, in a direction marked as 416. Moving yet farther (in terms of the distance along the movable arm 400) away from the beam marking device 104, the next illustrated movable component 410 can move the beam marking device 104 about an axis, in a direction marked as 412. Moving still farther away from the beam marking device 104, the next illustrated movable component 406 can move the beam marking device 104 about an axis, in a direction marked as 408. The farthest movable component 402 from the beam marking device 104 can move the beam marking device 104 about an axis, in a direction marked as 404. Thus, in some embodiments, the movable arm includes a plurality of pivoting movable components. In some embodiments, a movable arm 400 similar to that shown in FIG. 23 includes a more or less pivoting movable component. In other configurations, a movable arm 400, such as that shown in FIG. 23 includes one or more movable components that moves the beam marking device 104 along an axis, such as, for example, the movable component 230 of FIG. 22, which selective extends and retracts along an axis 216.

In some embodiments, the beam marking system 60 is fully or partially automated. Accordingly, in some embodiments, the beam marking system 60 comprises a controller, such as an electronic controller 330, which controls the operation of one or more components and subsystems of the beam marker. For example, the controller may control one or more of the sub-systems of the beam marking system 60, including, for example, the drive system, the movement of the clamp portion 72 of the chassis 70, the measuring system 78, the movable arm(s), and/or the beam marking device(s) 104. In some embodiments, the controller 330 comprises or is comprised in a computer system, such as a PC, a server, a thin client, or combinations thereof. In other embodiments, the controller includes a processor; hardware, software, or firmware; and communications components in electronic communication with and/or coupled to the beam marker 60.

In some embodiments, the computer system is in operable association with the beam marking system 60 such that it provides electronic control signals to the components, parts, and/or sub-systems of the beam marker to run the beam marking system 60 automatically, with minor human control or supervision. Accordingly, in some embodiments, the controller 330 comprises a computer program 332, such as a software, hardware, or firmware program, which receives data corresponding to a beam marking layout and translates this data to machine readable instructions that are transmitted to the respective components of the beam marking system 60 to control these components. For example, a beam marking layout may indicate that at a distance of ten feet from the zero point of the beam 30, a burn mark for a three inch hole should be marked on the center of the top surface of the web of the beam. Accordingly, the computer program 332 of the controller translates this data to machine readable instructions that are transmitted to the respective components of the beam marker 60. These instructions may, for instance, instruct the drive system and the measuring system 72 to advance the beam approximately ten feet so that the ten foot mark is disposed within the scanning area. The instructions may also instruct the upper movable arm 92 to move into position above the top web of the beam and scan the laser beam to mark a circular line approximately three inches in diameter in the center of the beam web, with the center of the hole at the ten foot point and in the center of the web. This process can be repeated for each mark required to be placed on a beam.

Accordingly, from the foregoing it will be seen that the beam marking system 60 herein described is capable of marking each exterior side of a beam with one or more laser scanners rapidly, accurately, and safely. The movable arm or arms enables the beam marking device 104 to be positioned along the external surfaces of the beam, and a laser beam marker enables rapid beam marks to be make on or in otherwise difficult to reach surfaces of a beam. Accordingly, the beam marking system 60 can overcome many of the problems previously involved in beam marking. Furthermore, the beam marking system 60 can, in some embodiments, provide markings on every exterior surface of a wide flange beam.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A beam marking system, comprising:
a beam marking device configured to mark on the surface of a beam;
a movable arm coupled to the marking device, the movable arm having at least three movable components that collectively move the beam marking device along or about at least three axes;
a chassis to which the movable arm is coupled, the chassis including:
a plurality of cam rollers on top of which the beam is placed;
a plurality of drive rollers for moving the beam in a forward and backward direction on the cam rollers; and
a clamp portion containing a plurality of idler rollers, the clamp portion being moveable on the chassis such that when the beam is placed on the cam rollers with one side of the beam being positioned against the drive rollers, the clamp portion can be adjusted so that the idler rollers are positioned against the other side of the beam to thereby apply sufficient force to the beam to enable the drive rollers to move the beam in the forward and backward direction; and
a controller that controls the movement of the at least three movable components of the movable arm and the movement of the drive rollers, and controls the operation of the marking device.

2. The beam marking system of claim 1, wherein the marking device is at least one of a laser marker, a plasma marker, an inkjet marker, and an etching device.

3. The beam marking system of claim 2, wherein the marking device is a laser marker that includes a laser source and a laser scanner.

4. The beam marking system of claim 2, wherein the laser marker includes a pulsed beam laser.

5. The beam marking system of claim 1, wherein the movable arm has at least four movable components that collectively move the beam marking device along or about at least four axes, and wherein the controller controlling the movement of the at least four movable members.

6. The beam marking system of claim 5, wherein the at least four axes include an X axis, a Y axis, a Z axis, and θ axis.

7. The beam marking system of claim 1, wherein the controller controls the movement of the at least three movable components of the movable arm and the movement of the drive rollers, and controls the operation of the marking device in accordance with a beam marking layout.

8. The beam marking system of claim 1, further comprising a measuring system having at least three measuring wheels positioned such that the measuring wheels contact a beam moving through the movement system and rotate when the beam is moved forwardly or backwardly along the cam rollers thereby measuring the distance the beam is moved.

9. The beam marking system of claim 8, the measuring system further comprising:
an averaging device adapted to average the distance measured between each of the at least three measuring wheels to arrive at an averaged measured position,
wherein the controller is adapted to track an advanced distanced to which the beam has been advanced by the beam marking system, the controller adapted to compare the advanced position to the averaged measured position and replace the advanced position with the averaged measured position if the advanced position does not equal the averaged measured position.

10. The beam marking system of claim 1, further comprising:
a second movable arm coupled to a second marking device that are controlled by the controller to mark on the surface of a beam.

11. A beam marking system comprising:
a chassis configured to support a beam;
a laser marker configured to mark on the surface of the beam;
a movable arm coupled to the chassis and the marking device, the movable arm having at least three movable components that collectively move the laser marker along or about at least three axes; and
a controller in electronic communication with the movable arm and the marking device, the controller controls the movement of the at least three movable components of the movable arm and controlling the operation of the laser marker.

12. The beam marking system of claim 11, wherein the movable arm has at least four movable components that collectively move the beam marking device along or about at least four axes, and wherein the controller controls the movement of the at least four movable members.

13. The beam marking system of claim 12, wherein the at least four axes include an X axis, a Y axis, a Z axis, and θ axis.

14. The beam marking system of claim 13, further comprising a computer program in operable association with the controller, wherein the computer program receives data corresponding to a beam marking layout and translates the beam marking layout data to machine readable instructions that are readable by the controller.

15. The beam marking system of claim 14, further comprising a second movable arm, the second movable arm being movable along at least three directions of movement, the second movable arm having a second marking device, the controller in electronic communication with the second movable arm and the second marking device, the controller controlling the position and movement of the second movable arm and controlling the operation of the second marking device.

16. The beam marking system of claim 15, further comprising:
a movement system moving the beam along the chassis; and
a measuring system measuring the movement of the beam along the chassis.

17. A beam marking system, comprising:
a chassis;
a movement system coupled to the chassis, the movement system moving a beam along the chassis;
a first beam marking device configured to mark on the surface of a beam;
a first movable arm coupled to the chassis, the first movable arm being coupled to the first beam marking device, the movable arm having at least four movable components that collectively move the beam marking device along or about at least four axes;
a second beam marking device configured to mark on the surface of a beam;
a second movable arm coupled to the chassis, the second movable arm being coupled to the second beam marking device, the movable arm having at least three movable components that collectively move the beam marking device along or about at least three axes;
a controller in electronic communication with the first and second movable arms and the first and second beam marking devices, the controller controlling the movement of the first and second movable arms and controlling the operation of the first and second beam marking devices.

18. The beam marking system of claim 17, wherein the marking device is a plasma marking device.

19. The beam marking system of claim 17, wherein the marking device is a laser marking device.

20. The beam marking system of claim 17, wherein the marking device is an etching device.

* * * * *